Dec. 26, 1950

R. F. WILD 2,535,248

FREQUENCY RESPONSIVE MEASURING AND
CONTROLLING APPARATUS

Filed July 29, 1944

*INVENTOR.*
RUDOLF F. WILD

BY

*C. B. Spangenberg*

ATTORNEY.

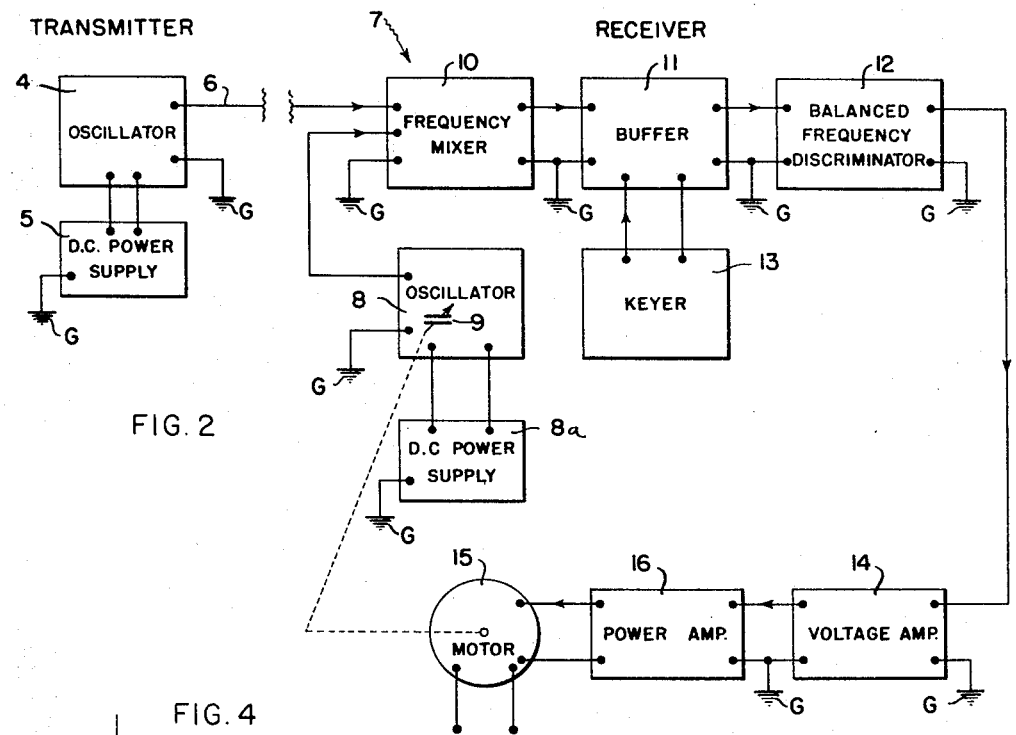
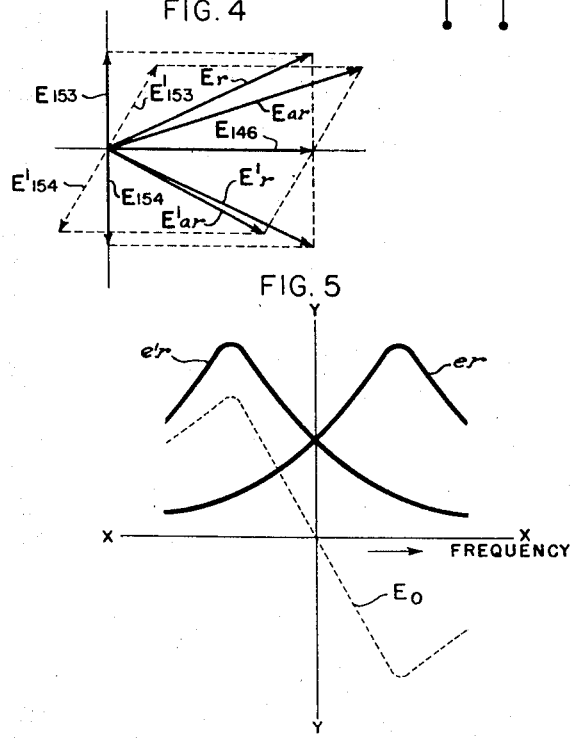

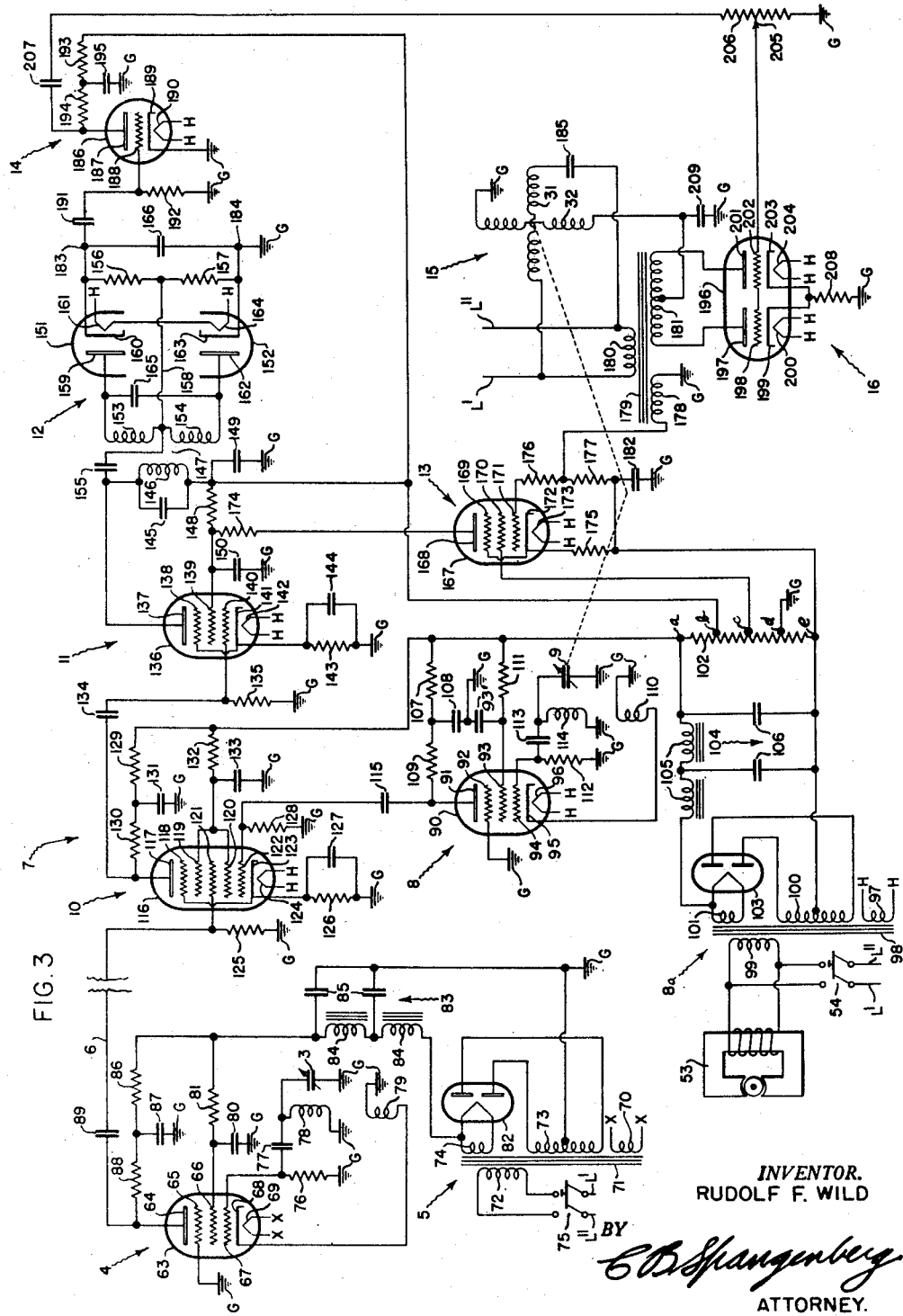

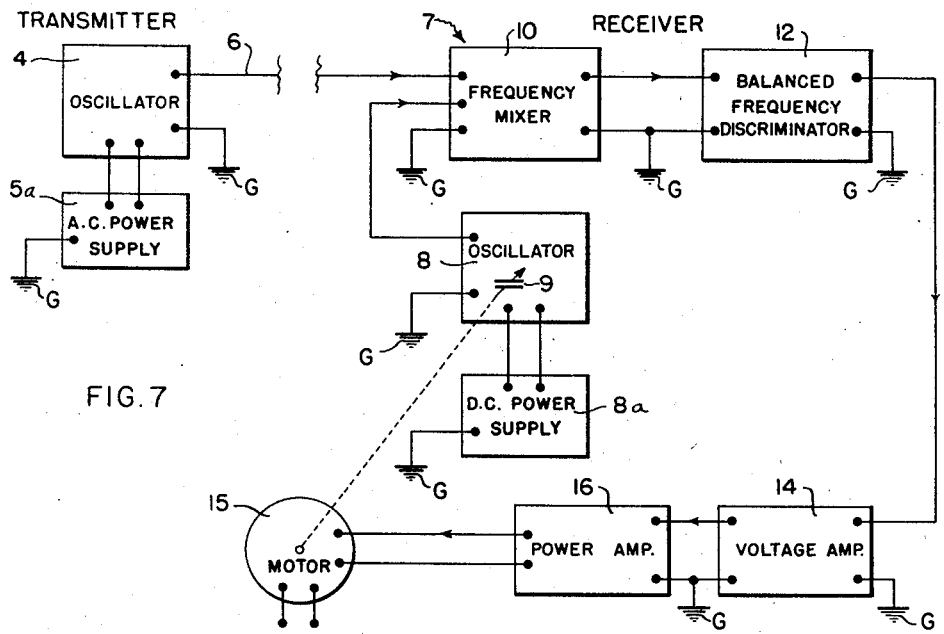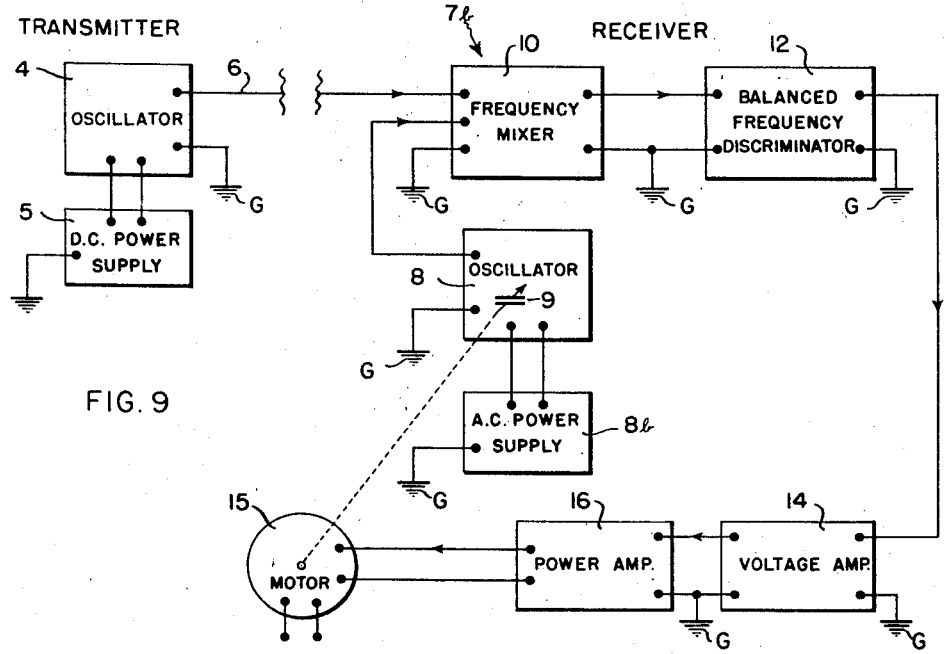

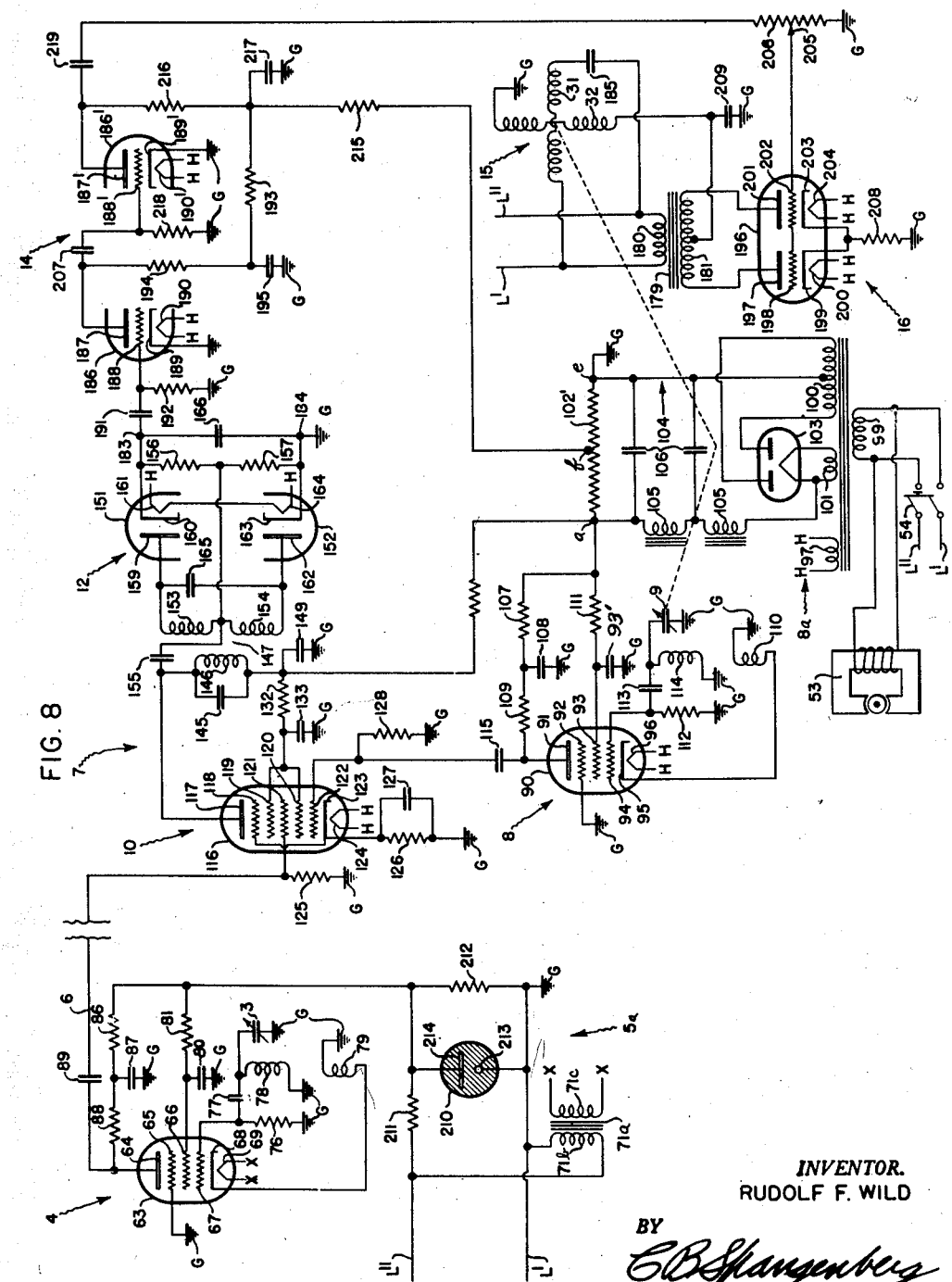

Dec. 26, 1950     R. F. WILD     2,535,248
FREQUENCY RESPONSIVE MEASURING AND
CONTROLLING APPARATUS

Filed July 29, 1944     7 Sheets-Sheet 6

INVENTOR.
RUDOLF F. WILD
BY
C. B. Spangenberg
ATTORNEY.

INVENTOR.
RUDOLF F. WILD

Patented Dec. 26, 1950

2,535,248

UNITED STATES PATENT OFFICE 2,535,248

FREQUENCY RESPONSIVE MEASURING AND CONTROLLING APPARATUS

Rudolf F. Wild, Philadelphia, Pa., assignor, by mesne assignments, to Minneapolis-Honeywell Regulator Company, Minneapolis, Minn., a corporation of Delaware Application July 29, 1944, Serial No. 547,253

14 Claims. (Cl. 318—28)

The present invention relates to measuring and controlling apparatus and more particularly to electrical apparatus for measuring, indicating, recording and/or controlling variable conditions such as temperature, pressure, liquid level and flow and also has utility for telemetering, torque amplifying, boat steering, remote control and repeater positioning purposes.

A general object of the invention is to provide improved electrical apparatus of the above mentioned character.

In my copending application Serial No. 537,505, filed on May 26, 1944, I have disclosed and claimed various apparatus embodiments of an electrical measuring and controlling apparatus of the above mentioned type. These apparatus embodiments are characterized in that they comprise tunable means including in combination an oscillator which generates a relatively high frequency oscillating current, means to amplitude modulate the high frequency current at the frequency of oscillation of a relatively low frequency current, balanced high frequency discriminating means responsive to the frequency of the modulated high frequency current and operative to create a signal voltage oscillating at the low frequency and of one phase or of opposite phase and having a magnitude depending respectively upon the direction and extent of the deviation of frequency of oscillation of the high frequency current from a predetermined value, and phase responsive motive structure controlled by the derived oscillating signal voltage. The phase responsive motive structure is employed to adjust the frequency of oscillation of the high frequency current, or alternatively the frequency value to which the discriminator means is tuned, as required to reduce to zero the low frequency oscillating signal voltage and thereby to rebalance the apparatus. The alternative rebalancing adjustment referred to, namely adjustment of the frequency value to which the frequency discriminator is tuned, has particular utility in telemetering and analogous apparatus in which the oscillator and its detuning means are remotely located with respect to the frequency discriminating means and the rebalancing motive structure.

In a later filed copending application Serial No. 543,892, filed on July 7, 1944, now Patent No. 2,404,344, I have disclosed and claimed other apparatus embodiments of an electrical measuring and controlling apparatus of the type described above having particular utility for telemetering and analogous purposes and wherein the rebalancing adjustments of the apparatus are accomplished independently of adjustment of the frequency value to which the discriminating means is tuned. Instead, a second oscillating signal voltage of the low frequency is locally generated at the receiver and mixed with the first oscillating signal voltage of low frequency to produce a resulting oscillating signal of said low frequency and of one phase or of opposite phase accordingly as the amplitude of the first oscillating signal voltage is greater or less than the second oscillating signal voltage. This resulting oscillating voltage is utilized to control the actuation of the phase responsive motive structure and the latter in turn is employed to vary the amplitude of oscillation of the second oscillating signal voltage. It is noted that in an apparatus of this type the balance of the apparatus depends upon both the phase and the amplitudes of two oscillating signal voltages or, stated differently, on two types of variables.

The present invention is directed to improvements in electrical measuring and controlling apparatus of the same general character as those disclosed in my above mentioned copending applications and is especially advantageous for telemetering and analogous purposes in that the rebalancing operations are accomplished independently of the frequency value to which the frequency discriminating means is tuned, and furthermore, the balance depends upon only one type of variable, namely, the frequencies of the two high frequency oscillating currents. The provision of such an arrangement forms a primary object of the present invention.

In particular, the arrangement of the present invention includes a transmitter comprising an oscillator for generating a high frequency oscillating current of substantially constant amplitude and of a frequency which varies in accordance with the effect to be indicated at a remote point. This effect may be some variable condition such as rate of flow, temperature, pressure, or the position of an element such as a pointer or the like. To this end the transmitter oscillator may desirably include a tunable circuit comprising an inductance element and a variable condenser connected in parallel relation, the condenser being adapted to have its capacity varied in accordance with the effect to be remotely indicated. For indicating the effect, there is provided a receiver which may be located at a point remote from the transmitter and connected thereto by means of a transmission line. If desired, wireless transmission may also be employed.

The receiver includes a local oscillator for generating a high frequency oscillating current of substantially constant amplitude and of variable frequency. In addition, a frequency mixer is provided for heterodyning the received high frequency oscillating currents received from the transmitter oscillator and from the local receiver oscillator. In one embodiment of the present invention the resulting oscillating current obtained from the frequency mixer is applied to a buffer tube which is made substantially non-conducting by means of keying or amplitude modulating means at regularly recurring intervals of a relatively low frequency which, merely by way of example, may be 60 cycles per second. The keyed or amplitude modulated oscillating output current from the buffer tube is applied to a balanced frequency discriminator which, in the balanced condition of the apparatus, may be tuned either to the sum or to the difference of the frequencies of the transmitter and receiver oscillators.

For deriving a reversible motor drive from the discriminator output voltage there are provided a voltage amplifier, a power amplifier and a two-phase rotating field induction motor as disclosed in my aforementioned copending applications. The local receiver oscillator is provided with a retuning element such as a variable condenser which is mechanically coupled to the motor shaft. When the apparatus is in balance, the sum or difference of the signal frequencies of the transmitter and receiver oscillators is equal to the balanced frequency of the discriminator. Upon change in the frequency of the oscillating current output of the transmitter oscillator, due, for example, to a change in the effect to be remotely indicated, the sum or difference of the oscillator frequencies is correspondingly changed. As a consequence, the discriminator produces an output signal voltage undulating at said relatively low frequency and of one phase or of opposite phase depending upon the direction of the change, which discriminator output signal voltage is operative to effect energization of the reversible motor in the proper direction to vary the capacity of the tuning condenser of the local oscillator as required to restore the sum or difference of the transmitter and receiver oscillator frequencies to the value to which the discriminator is tuned.

By properly shaping the rotor plates of the tuning condensers of the transmitter and receiver oscillators, it is possible to cause the position of the rotor of the tuning condenser of the receiver oscillator to assume any desired positional relationship with respect to the variable effect in accordance with which the transmitter oscillator tuning condenser is varied. For example, if the transmitter oscillator tuning condenser is varied by a differential pressure indicative of the rate of flow of a fluid through a pipe, the position of a pointer coupled to the tuning condenser of the receiver oscillator and the motor shaft may be made to indicate in a linear manner the rate of flow of the fluid through the pipe even though the differential pressure does not vary linearly with respect to said rate of flow.

In other embodiments of the invention which are disclosed, the amplitude modulating or keying means for causing the voltage output of the frequency discriminator to undulate at the relatively low frequency is dispensed with and such keying or amplitude modulation is obtained by means of direct keying of the transmitter and/or receiver oscillators. Thus, in one embodiment, the transmitter oscillator may be provided with an alternating aode voltage supply so that high frequency oscillating currents are created by the transmitter oscillator only during regularly recurring intervals of the low frequency of the alternating anode supply voltage. With this embodiment the balanced frequency discriminator is so designed that its balanced frequency is equal to the sum or difference of the frequencies of the transmitter and receiver oscillators during the intervals when the transmitter oscillator is operative. During the alternate intervals when the transmitter oscillator is not producing high frequency oscillating current, only high frequency currents from the receiver oscillator are impressed on the frequency discriminator. The frequency discriminator is so designed, however, that it is substantially non-responsive to oscillating currents of that frequency. As a result, zero output voltage is produced by the discriminator during such non-operative intervals of the transmitter oscillator and also during the intervals when the frequency of the resulting oscillating current output of the frequency mixer is the value to which the discriminator is tuned. Upon change in the frequency of oscillation of the transmitter high frequency current, however, an undulating voltage of the low frequency of the alternating anode supply voltage for the transmitter oscillator is created at the output terminals of the frequency discriminator. That undulating voltage is of one phase or of opposite phase depending upon the direction of the change and is utilized to control the selective energization of the reversible drive means to effect a corresponding change in the frequency of oscillation of the local receiver oscillator thereby to rebalance the apparatus.

In another embodiment of the invention which has been disclosed, the keying or amplitude modulation is accomplished by providing an alternating anode voltage supply for the local receiver oscillator. The manner of operation of this embodiment of my invention is substantially identical to that just described in which the transmitter oscillator is provided with an alternating anode voltage supply.

In a further embodiment of the invention both the transmitter and the receiver oscillators are provided with alternating anode voltage supply means so that both oscillators are operative to create high frequency oscillating currents only during concurrent and regularly recurring intervals. With this arrangement both oscillators preferably should be energized by a common alternating current supply line, or the alternating current supplied by individual supply lines should be approximately in phase. According to this embodiment, when the apparatus is balanced, the sum or difference of the frequency of the transmitter and receiver oscillators is the frequency value to which the frequency discriminator is tuned, and therefore, zero output voltage is obtained from the frequency discriminator. During the alternate half cycles of the alternating anode voltage supplied to the transmitter and receiver oscillators when the latter are not operative to create high frequency oscillating currents, no oscillating currents are applied to the input circuit of the frequency discriminator, and therefore, zero output voltage is obtained from the discriminator. Upon change in the frequency of the high frequency current output from the transmitter oscillator, however, the sum or difference of the transmitter and receiver oscillator frequencies produced during the operative half cycles is changed, and consequently, the discriminator produces an output signal voltage of one phase or of the opposite phase depending upon the direction of change. This undulating discriminator output voltage is utilized to control the selective actuation of the reversible drive means in the proper direction to effect a corresponding change in the frequency of oscillation of the high frequency current output of the receiver oscillator thereby to restore the frequency of oscillation of the current applied to the discriminator to the value to which the latter is tuned, and hence, to rebalance the apparatus.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which are illustrated and described preferred embodiments of the invention.

Of the drawings:

Fig. 2 is a block diagram illustrating the electrical circuit arrangement of the apparatus of Fig. 1;

Fig. 3 illustrates in detail the electrical circuit components of the circuit arrangement of the block diagram of Fig. 2;

Figs. 4, 5 and 6 are graphs illustrating the operation of the frequency discriminator of the circuit diagram of Fig. 3;

Fig. 7 is a block diagram illustrating a modification of the electrical circuit arrangement of the apparatus of Fig. 1;

Fig. 8 is a detailed wiring diagram illustrating the electrical circuit components of the block diagram of Fig. 7;

Fig. 9 is a block diagram illustrating a further modification of the electrical circuit arrangement of the apparatus of Fig. 1;

Figure 1:
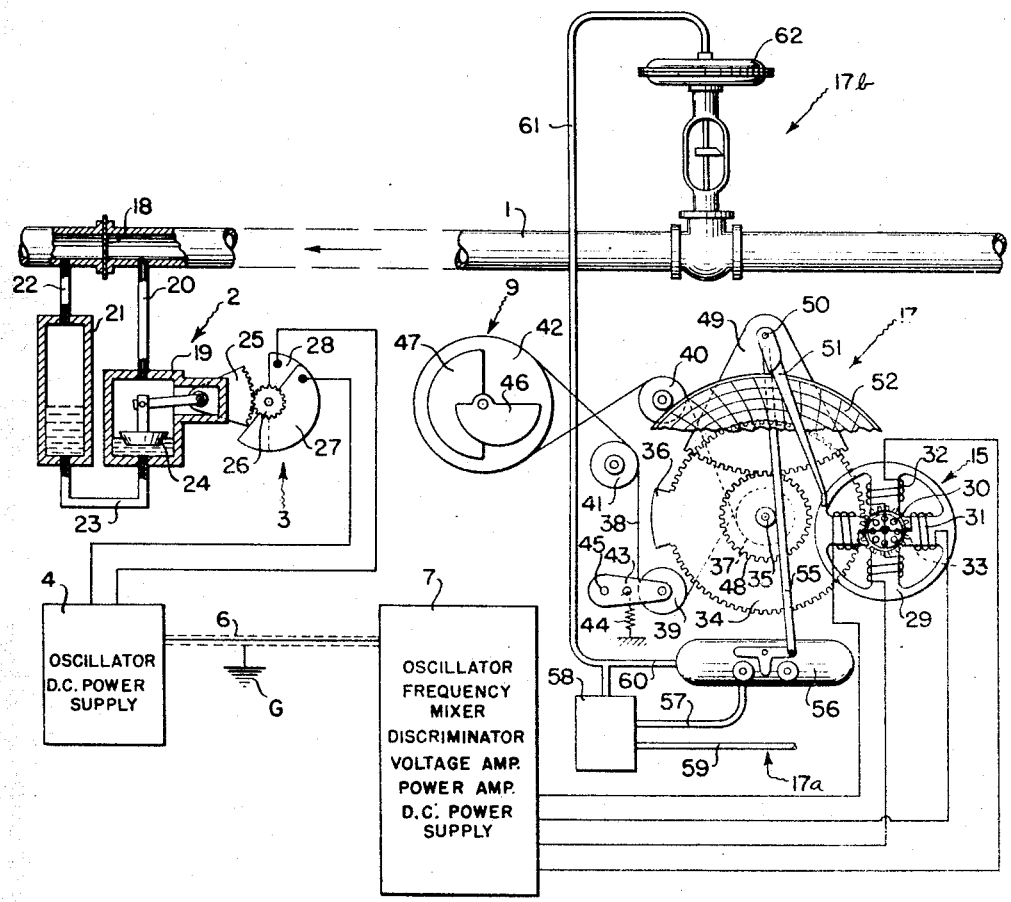
Fig. 1 is a diagrammatic illustration of one embodiment of the invention.

In Fig. 1 I have illustrated, in a more or less diagrammatic manner, a measuring, indicating, recording and controlling apparatus for measuring, indicating, recording and controlling the rate of flow of a fluid through a pipe or a conduit 1. The rate of flow of fluid through the pipe 1 is detected by a manometer, which is designated at 2, and is arranged to operate a variable tuning condenser, designated by the numeral 3, for detuning a resonant electrical circuit comprising the frequency determining circuit of a high frequency oscillator 4. The high frequency oscillator 4 is utilized as a generator and transmitter of high frequency oscillations and is provided with direct current power supply means 5, as shown in Fig. 2. The high frequency current output derived from the oscillator 4 is of variable frequency dependent upon the adjustment of the variable tuning condenser 3, and is conveyed by means of a transmission line, which may comprise a coaxial cable 6, to a receiver which has been designated by the reference numeral 7. If desired, matching stages or amplifiers may be added at both ends of the transmission line, or means for wireless transmission may be provided in the conventional manner.

The receiver 7, as shown in the block diagram of Fig. 2, comprises a local oscillator indicated at 8 and provided with a D. C. power supply means 8a for generating a high frequency oscillating current of substantially constant amplitude and of variable frequency depending upon the adjustment of a variable tuning condenser 9 which is connected in the frequency determining circuit of the oscillator 8. A frequency mixer, indicated at 10, is provided for heterodyning the received high frequency oscillating currents from the transmitter oscillator 4 and the high frequency currents from the receiver oscillator 8. The resulting oscillating current output from the frequency mixer 10 is applied to a buffer, indicated at 11, which is periodically made non-conducting by means of a keyer, indicated at 13. As shown in Fig. 3, the keyer 13 is supplied with energizing current from supply lines L' and L'' which supply alternating current having a relatively low frequency of 60 cycles per second. Consequently, the oscillating current output from the buffer 11 is keyed or amplitude modulated at 60 cycles per second. This oscillating current output is applied to a balanced frequency discriminator, indicated at 12, which may be tuned either to the sum or difference of the frequencies of the transmitter oscillator 4 and the receiver oscillator 8 in the balanced condition of the apparatus. Merely for purposes of illustration and example, the frequency discriminator 12 may be assumed to be tuned to the difference of the frequencies of the transmitter and receiver oscillating currents. When the frequency of the oscillating current output of the transmitter oscillator 4 is changed as a result of adjustment of the detuning condenser 3, the difference between the transmitter and receiver oscillator current frequencies is correspondingly changed. As a result, the discriminator 12 produces an output voltage undulating at the frequency of the alternating voltage of the supply lines L' and L'', namely, 60 cycles per second. Moreover, that undulating voltage is of one phase or of opposite phase with respect to the voltage of the supply lines L' and L'' depending upon the direction of adjustment of the transmitter detuning condenser 3.

For deriving a reversible motor drive from the discriminator undulating output voltage, there is provided a voltage amplifier 14, a power amplifier 16, and a reversible electrical motor indicated at 15. Thus, the undulating voltage output is amplified by the voltage amplifier 14 and the amplified quantity is applied to the power amplifier 16 which, in turn, operates under control of said amplified quantity to energize selectively the motor 15 for rotation in one direction or the other according to the phase of the undulating voltage, and hence, according to the direction of change of frequency of the high frequency current oscillations of the transmitter oscillator 4. The shaft of the motor 15 is mechanically coupled to the tuning condenser 9 connected in the frequency determining circuit of the receiver oscillator 8 and its operation is employed to vary the capacity of the tuning condenser 9 as required to restore the difference of the frequencies of the transmitter and receiver oscillations to the frequency value to which the discriminator 12 is tuned.

Merely by way of example, the balanced frequency of the frequency discriminator 12 may be made 450 kilocycles and the frequency of oscillation of the high frequency current output from the transmitter oscillator may be varied between 1450 kilocycles and 1000 kilocycles, while the frequency of the oscillating current output of the receiver oscillator 8 is simultaneously adjusted by means of the operation of motor 15 to the proper frequency between 1000 and 550 kilocycles so that the difference between the transmitter of receiver oscillator frequencies is always maintained at 450 kilocycles.

As may be seen by reference to Figs. 1 and 3, the motor 15 is a two-phase induction motor of the rotating field type. In addition to operating the retuning condenser 9 of the receiver oscillator 8, the motor 15 is also arranged to operate indicating and recording mechanism generally designated at 17 and control apparatus shown at 17a which, in turn, operates controlling means designated at 17b for controlling the flow of fluid through the pipe 1.

The manometer 2 for ascertaining the rate of fluid flow through the pipe 1 may be of any known type and, as shown, includes an orifice plate 18 which is positioned in the pipe 1 for creating a pressure differential across the orifice plate 18 which varies in accordance with the rate of fluid flow through the pipe. The pressure differential so produced is a square function of the rate of flow through the pipe 1. Manometer 2 also includes a high pressure chamber 19 which is connected by tube 20 to the high pressure side of the orifice plate 18 and includes a low pressure chamber 21 which is connected by a tube 22 to the low pressure side of the orifice plate 18. The low pressure chamber 21 and the high pressure chamber 19 communicate with each other through a tube 23.

The relative levels of mercury or other suitable liquid located within the pressure chambers 19 and 21 vary in accordance with the pressure difference within those chambers, and consequently, provide a measure of the rate of fluid flow through the pipe 1. A member 24 which floats on the mercury in the high pressure chamber 19, and therefore rises and falls in accordance with variations in pressure differential in the two chambers 19 and 21, is arranged to deflect angularly a gear sector 25. The gear sector 25 meshes with a spur gear 26 which is operatively associated with the detuning means or variable tuning condenser 3. The variable condenser 3 comprises movable condenser plates 27 which are deflected relatively to stationary condenser plates 28 upon angular deflection of the gear sector 25. By way of example, an increase in the rate of fluid flow through the pipe 1 may be assumed to cause the condenser plates 27 to rotate in a clockwise direction to decrease the capacity between the condenser plates 27 and 28.

As shown in Fig. 1, the reversible electrical motor 15 includes a stator 29 and a squirrel cage rotor 30 which is provided with suitable conductor bars. As those skilled in the art will understand, the rotor 30, if desired, may comprise a rotatable cup composed of copper or aluminum. Such a rotor is desirable in applications wherein a low inertia rotor is required. A power winding 31 and a control winding 32 are wrapped around suitable pole pieces provided on the stator 29. Depending upon the phase relation of the electrical current flowing through the control winding 32 with respect to the current flowing through the power winding 31, as is more fully explained hereinafter, the rotor 30 is actuated for rotation in one direction or the other to cause rotation of a pinion gear 33 in a corresponding direction.

The pinion gear 33 drives a gear 34 which is carried by a shaft 35 and is provided with a projection 36 which abuts against the pinion gear 33 for the purpose of limiting the extent of rotation of the gear 34.

Gear 34 carries a cable drum 37 which operates a cable 38 over pulleys 39, 40, 41 and 42. The pulley 39 is carried by a lever 43 which is biased by a spring 44 in a clockwise direction about the pivot point 45 of the lever to maintain the cable 38 taut. The pulley 42 is arranged to operate the retuning means or variable tuning condenser 9 which, as seen in Fig. 1, comprises a variable condenser having movable condenser plates 46 adapted to be rotated with respect to relatively stationary condenser plates 47 upon rotation of the pulley 42. The retuning means 9, therefore, is adjusted in accordance with the angular positions assumed by the rotor 30 of the motor 15.

Shaft 35 which carries the gear 34 also operates an indicating pointer (not shown) with respect to a suitable calibrated indicating scale, also not shown. Also mounted on the shaft 35 is a gear 48 which meshes with a gear sector 49 so that upon rotation of the motor 15 the gear sector 49 is rotated about its pivot 50. The gear sector 49 positions a pen arm 51 with respect to a slowly rotating chart 52 for the purpose of providing a continuous record of the rate of fluid flow through the pipe 1 on the chart 52. Chart 52 is driven at a constant slow speed by a unidirectional synchronous motor 53 which, as shown in Fig. 3, is supplied with alternating energizing current from supply lines L' and L" through a switch 54. The gear sector 49 also operates an arm 55 which is arranged to adjust the position of the flapper of a pneumatic control device 56 forming a part of the control apparatus 17a. The pneumatic control device 56 may be of the type shown and described in Patent No. 2,125.081 which was issued to C. B. Moore on July 26, 1938, and includes a nozzle valve which is disposed in cooperative relation to the flapper and is connected by a bleed line 57 to a pilot valve 58 supplied with air under pressure by a pipe 59. The pressures developed by the pilot valve 58 are transmitted through a pipe 60 to the pneumatic control device 56 and by a pipe 61 to a pneumatic motor 62 in the control means 17b for controlling the rate of fluid flow through the pipe 1. The pneumatic control apparatus including the control device 56, the pilot valve 58 and the control means 17b may advantageously be utilized for the purpose of maintaining the rate of fluid flow through the pipe 1 at a substantially constant value.

The details of construction of the reversible motor 15, the indicating and recording apparatus 17 and the pneumatic control apparatus 17a and 17b are completely illustrated and described in a copending application of Walter P. Wills, Serial No. 421,173, filed on December 1, 1941, which issued as Patent No. 2,423,540 on July 8, 1947. Therefore, further disclosure thereof is not considered necessary herein.

The electrical circuit arrangement of the transmitter and receiving apparatus of my present invention, shown in more or less diagrammatic manner in the block diagram of Fig. 2, is illustrated in more detail in Fig. 3 wherein are shown the various electrical components comprising the various units of the block diagram of Fig. 2.

Transmitter oscillator 4 as shown in Fig. 3 is an electron coupled oscillator and includes a pentode tube 63 which may be of the commercially available type 6SJ7. Tube 63 includes an anode 64, a suppressor grid 65, a screen grid 66, a control grid 67, a cathode 68 and a heater filament 69. The heater filament 69 is connected to and receives energizing current from the secondary winding 70 of a transformer 71 having a line voltage primary winding 72, a high voltage secondary winding 73 and a low voltage secondary winding 74 in addition to the low voltage secondary winding 70. Line voltage primary winding 72 is connected to alternating current supply lines L′ and L″ through a switch 75. The supply lines L′ and L″ lead from a source of alternating current which supplies alternating current of relatively low frequency, for example, 60 cycles per second, although it will be understood that other frequencies of alternation may be employed equally as well. The transformer 71 is contained in and comprises a part of the D. C. power supply means 5 for the transmitter oscillator 4.

Control grid 67 of the pentode tube 63 is connected through a resistance 76 to ground G and is also connected through a condenser 77 to one terminal of a parallel circuit including the variable condenser 3 in one branch and an inductance coil 78 in the other branch. The inductance coil 78 is inductively coupled to a coil 79 and together with the latter and condenser 3 provides for high frequency operation of the oscillator. The cathode 68 is connected through the inductance coil 79 to ground G. Screen grid 66 is connected through a condenser 80 to ground G and is also connected through a resistance 81 to the positive terminal of the D. C. voltage supply means 5, the negative terminal of which is connected to ground G. As shown, the D. C. voltage supply means 5 includes a full wave rectifier tube 82 and a filter indicated generally at 83 in addition to the transformer 71. Rectifier tube 82 includes a pair of anodes and a filament type cathode which has its terminals connected to the low voltage transformer secondary winding 74. One end terminal of the high voltage secondary winding 73 is connected to one anode of rectifier 82 and the other anode thereof is connected to the other end terminal of the winding 73. The center tap on the high voltage secondary winding 73 is connected to ground G and constitutes the negative terminal of the D. C. voltage supply means. The filament of the rectifier tube 82 comprises the positive terminal of the D. C. voltage supply means and is connected through suitable inductances 84 provided in the filter 83 to the positive output terminal of the D. C. voltage supply means 5. The filter 83 is also provided with suitable condensers 85, as shown.

A resistance 86 and a condenser 87 are also provided for line voltage compensation purposes to the end that the frequency of oscillation of the oscillator 4 will remain constant regardless of line voltage variations. Anode 64 is connected through a resistance 88 to the point of connection of resistance 86 and condenser 87. The suppressor grid 65 of the tube 63 is connected to ground G and serves the usual purpose of decreasing secondary emission from the anode 64.

The oscillating circuit of the oscillator 4 includes the control grid circuit of which the parallel network including the tuning condenser 3 forms a part, and also includes the screen grid circuit which may be traced from the positive output terminal of the filter 83 through resistance 81, screen grid 66, cathode 68, inductance coil 79 and ground G to the negative terminal of the filter 83. These control grid and screen grid circuits are inductively coupled by the inductance coils 78 and 79 and provide for high frequency operation within a suitable range of frequencies which, as previously noted, may be in the region from 1450 to 1000 kilocycles. The anode 64 of the tube 63 is electron coupled to the screen grid 66 and accordingly the high frequency oscillating currents conducted through the screen grid circuit are operative to cause the voltage of the anode 64 to oscillate at the same high frequency.

The anode or output circuit of the oscillator 4 is shown as being directly coupled to the receiver 7 by means of a condenser 89 and the transmission line 6. While the anode or output circuit of the oscillator 4 has been so shown, it will be understood that stages of amplification and isolation and an impedance matching network may be employed, if desired. Moreover, means for wireless transmission to the receiver 7 may also be provided in the well known and conventional manner, if desired.

Oscillator 8 contained in the receiver 7 may be and has been shown as being identical to the oscillator 4 and includes a pentode tube 90 which may be of the commercially available type 6SJ7. The tube 90 includes an anode 91, a suppressor grid 92, a screen grid 93, a control grid 94, a cathode 95 and heater filament 96. Heater filament 96 is connected to and receives energizing current from the secondary winding 97 of a transformer 98 located in the D. C. power supply means 8a. The transformer 98 includes a primary winding 99 having its terminals connected through the switch 54 to the supply lines L′ and L″, and also includes a center tapped high voltage secondary winding 100 and a low voltage secondary winding 101 in addition to the low voltage secondary winding 97.

As shown, the D. C. supply means 8a is identical to the D. C. supply means 5 and includes a full wave rectifier tube 103 and a filter designated generally at 104 and comprising suitable inductance coils 105 and suitable condensers 106. The negative terminal of the D. C. supply means 8a is connected to the center tap of the high voltage secondary winding 100 and the positive terminal thereof is connected to the filament of the rectifier tube 103. A voltage divider resistance 102 provided with terminals designated a, b, c, d and e is connected between the positive and negative output terminals of the filter 104. Terminal d is connected directly to ground G.

For the purpose of providing compensation for line voltage variations so that line voltage changes produce no significant change in the frequency of oscillation of the oscillator 8, a resistance 107 and a condenser 108 are connected between the positive terminal a and grounded terminal d. The point of connection of the resistance 107 and condenser 108 is connected through a resistance 109 to the anode 91, and the cathode 95 of tube 90 is connected through an inductance coil 110 to the grounded terminal d on the voltage divider.

Screen grid voltage is supplied to the oscillator tube 90 from the divider resistance 102 through a circuit which may be traced from the positive terminal a through a resistance 111 to the screen grid 93, cathode 95 and inductance coil 110 to the grounded point d. Suppressor grid 92 is directly connected to ground G and is provided for decreasing secondary emission from the anode 91. A condenser 93' connects the screen grid 93 to ground G.

Control grid 94 is connected through a resistance 112 to ground G and is also connected through a condenser 113 to one terminal of a parallel circuit including the retuning means or variable tuning condenser 9 in one branch and an inductance coil 114 in the other branch. The inductance coil 114 is inductively coupled to the inductance coil 110. If desired, a trimming condenser, not shown, may be connected in parallel with the condenser 9 and inductance coil 114 for providing a fine adjustment of the zero setting of the instrument pen and pointer.

The screen and control grid circuits of the tube 90 are inductively coupled by the inductance coils 110 and 114 and are so arranged as to provide for high frequency operation over a range of frequencies in the region, for example, from 1000 to 550 kilocycles. Anode 91 of the tube 90 is electron coupled to the screen grid 93 so that the high frequency oscillating currents flowing through the screen grid circuit may cause the voltage of the anode 91 to oscillate at the same high frequency.

The anode or output circuit of the oscillator 8 is coupled by means of a condenser 115 to an input circuit of the frequency mixer 10 and the transmission line 6 is also coupled to an input circuit of the frequency mixer 10. As shown, the frequency mixer 10 includes a multi-grid tube 116 having an anode 117, suppressor grid 118, first and second screen grids 119 and 120, first and second control grids 121 and 122, a cathode 123 and a heater filament 124. The heater filament 124 is connected to and receives energizing current from the low voltage transformer secondary winding 97. The first control grid 121 is connected by the transmission line 6 and condenser 89 to the anode 64 of the transmitter oscillator tube 63 and is also connected through a resistance 125 to ground G. The cathode 123 is connected through a parallel connected resistance 126 and condenser 127 to ground G. The second control grid 122 is connected through a resistance 128 to ground G and is also connected through the condenser 115 to the anode 91 of the receiver oscillator 8.

Anode voltage is supplied to the frequency mixer tube 116 from the voltage divider resistance 102 through a circuit which may be traced from the positive terminal a through resistances 129 and 130 to the anode 117, the cathode 123 and the parallel connected resistance 126 and condenser 127 to grounded terminal d on the voltage divider. Resistance 129 and a condenser 131 connected between the point of connection of resistances 129 and 130 and ground G are employed to provide a radio frequency by-pass to ground to prevent the high frequency currents in the anode circuit of tube 116 from flowing to the D. C. voltage supply means 8a. The suppressor grid 118 is directly connected to the cathode 123.

Screen grids 119 and 120 are connected together and are supplied with voltage from the voltage divider resistance 102 through a circuit which may be traced from terminal a through a resistance 132 to the screen grids, cathode 123 and the parallel connected elements 126 and 127 to the grounded terminal d. The screen grids are also connected through a condenser 133 to ground G.

The frequency mixer 10 is provided for heterodyning the high frequency currents conveyed to the receiver 7 from the transmitter oscillator 4 and the high frequency oscillating currents created in the output circuit of the receiver oscillator 8. As will be understood by those skilled in the art, the current flow through the output circuit of the frequency mixer 10 will include separate components of the same frequency as the high frequency currents generated by each of the oscillators 4 and 8 and will also include a component equal to the sum of the frequencies generated by the oscillators 4 and 8 and another component equal to the difference of those oscillating frequencies. These high frequency current components flowing in the output circuit of the frequency mixer 10 are coupled by means of a condenser 134 and a resistance 135 to the input circuit of the buffer 11.

The buffer 11 includes a pentode tube 136 which may be of the commercially available type 6SJ7. The tube 136 includes an anode 137, a suppressor grid 138, a screen grid 139, a control grid 140, a cathode 141 and a heater filament 142. Energizing voltage is supplied to the heater filament 142 from the low voltage transformer secondary winding 97.

The control grid 140 is connected to the point of engagement of the coupling condenser 134 and the resistance 135 and is connected through the resistance 135 and a parallel connected cathode bias resistance 143 and condenser 144 to the cathode 141. According to one embodiment of the present invention, the coupling condenser 134 and resistance 135 are so chosen as to provide optimum transmission of the current component in the output circuit of the frequency mixer 10 having a frequency equal to the difference of the frequencies of the oscillators 4 and 8. In another embodiment optimum transmission of the current component having a frequency equal to the sum of the frequencies of the oscillators 4 and 8 is provided. If desired, a filter may be inserted between the output circuit of the frequency mixer 10 and the input circuit of the buffer 11 for insuring that only the desired frequency component derived from the oscillators 4 and 8 is impressed on the input circuit of the buffer 11.

Anode voltage is supplied to the buffer 11 from the voltage divider resistance 102 through a circuit which may be traced from the terminal b on the voltage divider resistance through a parallel circuit including a condenser 145 in one branch and the primary winding 146 of an intermediate frequency transformer 147 in the other branch to the anode 137, the cathode 141 and the parallel connected resistance 143 and condenser 144 to the grounded terminal d. The suppressor grid 138 is directly connected to the cathode 141.

Screen grid voltage is supplied to the tube 136 from the divider resistance 102 through a circuit which may be traced from the terminal b through a resistance 148 to the screen grid 139, the cathode 141 and the parallel connected resistance 143 and condenser 144 to the grounded terminal d. A condenser 149 is connected between the terminal b and ground G for filtering the voltage impressed on the screen grid 139. The screen grid 139 also is connected directly by a condenser 150 to ground G.

The frequency discriminator 12 is of the so-called balanced type and includes the intermediate frequency transformer 147 and a pair of diode rectifiers 151 and 152 which desirably may be contained within a single envelope and for example may comprise the diode elements of a commercially available type 6H6 tube. The intermediate frequency transformer 147 includes a split secondary winding in addition to the primary winding 146, one half of the split secondary winding being designated by the reference numeral 153 and the other half by the numeral 154. The center tap of the split secondary winding is connected through a blocking condenser 155 to the anode 137 of the buffer pentode tube 136 and also to the upper terminal of the primary winding 146. That center tap is also connected to the point of engagement of a pair of resistances 156 and 157 by means of a conductor 158.

As shown, the diode 151 includes an anode 159, a cathode 160 and a heater filament 161, and the diode 152 includes an anode 162, a cathode 163 and a heater filament 164. The heater filaments are connected in series and are supplied with energizing current from the transformer secondary winding 97. Cathode 160 is connected through resistance 156 to the center tap of the split secondary winding and cathode 163 is connected through the resistance 157 to the said center tap. The anode 159 is connected to the end terminal of the split secondary winding section 153, and the anode 162 is connected to the end terminal of the split secondary winding section 154. A condenser 165 is connected across the terminals of the split secondary winding for tuning the latter to the center frequency about which the effective component of the oscillating output current of the frequency mixer 10 is adapted to be varied. On the assumption that the condenser 134 and resistance 135 are so chosen as to provide optimum transmission to the input circuit of the frequency discriminator of the oscillating current component in the output circuit of the frequency mixer 10 having a frequency equal to the difference of the frequencies of oscillation of the oscillators 4 and 8, the condenser 165 is so chosen in relation to the discriminator constants as to tune the split secondary winding of the frequency discriminator 12 to that difference frequency, namely, 450 kilocycles per second. When condenser 134 and resistance 135 are so chosen as to provide optimum transmission of the oscillating current component in the output circuit of the frequency mixer 10 having a frequency equal to the sum of the frequencies of oscillation of the oscillators 4 and 8 to the input circuit of the discriminator, the condenser 165 is so chosen as to tune the discriminator to that frequency. A condenser 166 is connected in parallel with both of the resistances 156 and 157. The blocking condenser 155 and the condenser 166 are so selected as to present low impedance to the high frequency oscillating current flow through them. The condenser 145 and the transformer primary winding 146 are so selected as collectively to provide high impedance in order to produce a large output signal from the discriminator. Preferably, the primary winding 146 is tuned to the same frequency as that to which the split secondary winding is tuned.

When the frequency of the oscillating current applied to the transformer primary winding 146 is the value to which both the transformer primary winding 146 and the split secondary winding are tuned, namely 450 kilocycles per second, the voltage induced in the secondary winding sections 153 and 154 and appearing across the terminals of the split secondary winding will be 90° out of phase with the applied primary voltage. This voltage relationship is shown graphically in Fig. 4 wherein the vector $E_{146}$ represents the voltage applied to the primary winding 146 and the vectors $E_{153}$ and $E_{154}$, respectively, represent the voltages produced across the split secondary winding sections 153 and 154. The phenomenon giving rise to the 90° phase shift between the primary and secondary voltages is one known in the art and therefore needs no explanation herein.

The secondary winding sections 153 and 154 are so wound on the transformer 147 that the voltage appearing across the winding 153 is 180° out of phase with the voltage produced across the winding 154. This relationship also is shown in Fig. 4. The voltage produced across section 153 is impressed on the circuit including the diode rectifier 151 and the resistance 156 while the voltage developed across the section 154 is impressed on the circuit including the diode 152 and the resistance 157. Superimposed on each of these voltages is the voltage produced across the primary winding 146. Since the upper terminal of the primary winding 146 is connected through the blocking condenser 155 to the center tap of the split secondary winding and the lower terminal of the winding 146 is connected through condenser 149 to ground G, and since the remote ends of the resistances 156 and 157 are each connected to ground G through paths presenting low impedance to the high frequency currents impressed on the discriminator, the primary voltage is superimposed on the voltage produced across section 153 on the circuit including diode 151 and resistance 156 and also is superimposed on the voltage produced across section 154 on the circuit including diode 152. Thus, the resultant voltage impressed on the circuit including the diode 151 is the vector sum of the primary voltage $E_{146}$ and the secondary voltage $E_{153}$, which vector sum is represented in Fig. 4 by the vector $E_r$. The vector $E'_r$ in Fig. 4 represents the resultant voltage impressed on the circuit including the diode 152. It is noted that in each case the resultant voltage on each diode is the vector sum of two voltages which are in phase quadrature at resonance. The secondary voltage applied to the diode 151, however, leads the primary voltage by 90°, while the secondary voltage applied to the diode 152 lags by 90° the primary voltage. The absolute values of the primary and secondary voltages are not critical and may be selected as desired.

The 90° phase relationship between the voltage applied to the primary winding 146 and the voltages appearing across the secondary winding sections 153 and 154 exists only when the applied frequency to the primary winding 146 is the value to which both the primary and the split secondary windings are resonant. Upon departure of the applied frequency from this value, the voltages produced across the secondary winding sections 153 and 154 also depart from the 90° phase relationship with the voltage applied to the primary winding, as may be seen by reference to the vectors $E'_{153}$ and $E'_{154}$ in Fig. 4. For example, upon increase in the applied frequency from the value to which the secondary winding is resonant, the phase displacement between the voltage produced across the secondary winding section 153 and the applied primary voltage decreases toward zero while the phase displacement between the voltage produced across the secondary winding section 154 and the primary winding increases toward 180°. Upon decrease in the applied frequency the opposite condition exists, that is to say, the phase displacement between the vectors $E_{153}$ and $E_{146}$ in Fig. 4 increases toward 180° while the displacement between the vectors $E_{154}$ and $E_{146}$ decreases toward zero.

When the applied frequency to the primary winding 146 deviates slightly, for example, increases from the value to which the secondary winding is tuned, the resultant voltage applied to the diode 152 will decrease as shown by the vector $E'_{ar}$ while the resultant voltage supplied to the other diode 151 will increase as is indicated by the vector $E_{ar}$. Upon greater deviation in the applied frequency in the same direction, the resultant voltage applied to the first mentioned diode 152 will continue to decrease while the voltage applied to the second mentioned diode 151 will increase to a maximum value and upon still greater deviation will begin to decrease as may be seen by reference to Fig. 5 wherein the curve $er$ represents the manner in which the resultant voltage applied to the diode 151 changes upon variation in the applied frequency and the curve $e'r$ represents the manner in which the resultant voltage applied to the diode 152 simultaneously changes.

By referring to Fig. 5, it will be noted that the resultant voltage $er$ applied to the diode 151 will increase initially as the applied frequency increases from the value to which the secondary winding is resonant until it reaches a maximum value after which it will begin to decrease as the applied frequency is changed further in the same direction. The resultant voltage then applied to the other diode 152 will decrease and continue gradually to decrease as the applied frequency deviates further from the resonant value. As a result of this action the voltage drop produced across the resistance 156 will be increased while that produced across the resistance 157 will be decreased.

Upon deviation in the frequency of oscillation of the current applied to the discriminator in the opposite direction from the value to which the discriminator is tuned, the resultant voltage applied to the diode 151 will decrease while the voltage applied to the diode 152 will increase to a maximum value, following which the latter voltage will also begin to decrease. Because of this action the voltage drop produced across the resistance 157 will be increased while the voltage drop produced across the resistance 156 will be decreased.

The manner in which the voltage drops developed across the resistances 156 and 157 change with variation in the applied frequency is illustrated in Fig. 5 by the curve $E_0$. At the point of intersection of the curve $E_0$ with the $x$—$x$ axis, the voltage drops produced across the resistances 156 and 157 are equal. A portion of the curve $E_0$ to the right of the $y$—$y$ axis represents the difference in the voltage drops across the resistances 156 and 157, the voltage drop across resistance 156 being the greater and occurring upon an increase in the applied frequency from the value to which the discriminator 12 is tuned. The portion of curve $E_0$ at the left of the $y$—$y$ axis represents the difference in magnitudes of the voltage drops across the resistances 156 and 157, the voltage drop across the resistance 157 being the greater and occurring upon a decrease in applied frequency.

In the arrangement of Fig. 3, there are two normal operating conditions in which the resultant of the voltages produced across the resistances 156 and 157 is zero. The first is that occurring when no high frequency or other currents are applied to the discriminator. The second is that occurring when the frequency of the high frequency currents applied to the discriminator is the value to which the discriminator is tuned. These normal operating conditions are utilized in the apparatus of my present invention to cause the resultant voltage produced across the resistances 156 and 157 to pulsate upon deviation of the frequency of the oscillating currents applied to the discriminator from the value to which the latter is tuned. Further, the said resultant voltage is made to pulsate at the relatively low frequency of the voltage of the supply lines L' and L'' and is of one phase or of opposite phase relative to the supply line voltage depending upon the direction of deviation in the frequency of the applied oscillating currents from the value to which the discriminator is tuned.

To the attainment of this end the high frequency oscillating current output of the buffer 11 is substantially 100% square wave amplitude modulated at the relatively low frequency of the voltage of the supply lines L' and L'' by means of the keyer 13. As shown, the keyer 13 includes a pentode tube 167 which may be of the commercially available type 6SJ7 including an anode 168, a suppressor grid 169, a screen grid 170, a control grid 171, a cathode 172 and a heater filament 173. Energizing current is supplied to the heater filament from the transformer secondary winding 97.

Anode voltage is supplied to the tube 167 from the voltage divider resistance 102 through a circuit which may be traced from the terminal $b$ through resistance 148 and a resistance 174 to the anode 168, cathode 172 and a cathode bias resistance 175 to the negative terminal $e$ of the voltage divider resistance 102. It is noted that the condenser 149 also serves to provide a radio frequency by-pass to ground in the anode circuit of tube 136. Suppressor grid 169 is directly connected to the cathode 172 for the purpose of minimizing secondary emission from the anode 168.

Voltage is supplied to the screen grid 170 from the voltage divider resistance 102 through a circuit which may be traced from the terminal $c$ to the screen grid 170, cathode 172 and bias resistance 175 to the negative terminal $e$ on the voltage divider 102.

Control grid 171 is connected through a pair of series connected resistances 176 and 177 to the negative terminal of bias resistance 175, the other terminal of which is connected to the cathode 172. Alternating voltage of the same relatively low frequency as that supplied by the supply lines L' and L'' is impressed on the resistance 177 from the secondary winding 178 of a transformer 179 having a line voltage primary winding 180. The terminals of the line voltage primary winding 180 are connected to the supply lines L' and L'', preferably through a switch, not shown but which may be the switch 54. The transformer 179 is also provided with a center tapped secondary winding 181 which is employed for the purpose of supplying energizing current to the power amplifier 16 and also to the reversible motor 15.

The circuit path through which the alternating current is impressed on the resistance 177 may be traced from the lower terminal of resistance 177 through a condenser 182 to ground G, to the right end terminal of the transformer secondary winding 178 and from the other terminal of the latter to the upper end of the resistance 177. Alternating current flow through the resistance 177 produces a voltage drop across it which is operative to make the keyer tube 167 conductive and non-conductive at the frequency of the voltage of the supply lines L' and L''. This causes the voltage of the anode 168 to fluctuate with an approximately square wave form between a value approximating the potential of the terminal b on the voltage divider resistance 102 and a value approximating the potential of the terminal e thereon. Since the screen grid 139 of the tube 136 is connected through resistance 174 to the anode 168 of tube 167, the screen grid 139 is made to fluctuate in a corresponding manner. Accordingly, the tube 136 is made alternately conductive and substantially non-conductive at the relatively low frequency of the supply lines L' and L''. Consequently, high frequency oscillating currents of substantially constant amplitude flow in the output circuit of the buffer 11 and are applied to the frequency discriminator 12 only during the intervals in which the tube 136 is conductive. During the alternate intervals when the tube 136 is non-conductive no high frequency currents are applied to the discriminator.

From the foregoing it will be apparent that the resultant of the potentials produced across the resistances 156 and 157 and appearing between the terminals 183 and 184 is zero when the frequency of oscillation of the high frequency currents applied to the discriminator 12 is the value to which the discriminator is tuned and that upon deviation in the frequency of the applied high frequency oscillating currents to the discriminator in one direction or the other from the resonant value, a pulsating voltage of one phase or of opposite phase with respect to the voltage of the supply lines L' and L'' is created between the terminals 183 and 184. It will be evident also that the amplitude of fluctuation of the undulating voltage so produced between the terminals 183 and 184 is dependent only upon the extent of deviation of the applied frequency from the value to which the discriminator is tuned. Moreover, since the high frequency oscillating currents applied to the discriminator 12 are amplitude modulated by the keyer 13 with an approximately square wave form at the frequency of the voltage supplied by the supply lines L' and L'', the undulating voltage produced between the terminals 183 and 184 is also substantially of a square wave form and of the same frequency as is shown in Fig. 6, wherein the curve Es represents the supply line voltage while the curves Ei and Ed respectively represent in-phase and out of phase discriminator output voltages.

Those skilled in the art will recognize that the invention in its practical application is not restricted to the use of a frequency discriminator 12 of the type disclosed and that other types, particularly those conventionally employed for automatic frequency control and frequency modulation detection in radio broadcast receivers, may be employed equally as well.

As noted hereinbefore, the reversible motor 15, as seen in Fig. 1, is provided with a stator 29 having 4 pole pieces which are physically spaced apart by 90° and also includes a rotor 30. It will be evident that more than 4 pole pieces may be provided on the motor 15 if desired. The power winding 31 is wrapped around two of the opposite pole pieces of the stator 29 and the control winding 32 is wrapped around the remaining two opposite pole pieces. When only the power winding 31 is energized, the rotor 30 is not urged to rotation in either direction and remains stationary. The rotor 30 is actuated for rotation in one direction, for example in a clockwise direction, when the control winding 32 is energized and the voltage and current through it lead the voltage and current, respectively, in the power winding 31. When the voltage and current in the control winding 32 lag the voltage and current, respectively, in the power winding 31, the rotor 30 rotates in the opposite direction.

The motor 15 is preferably so constructed that the control winding 32 has a high impedance to match the impedance of the anode circuit of the power amplifier 16 when the rotor 30 is rotating at full speed. By providing a power winding 31 having high impedance, increased efficiency of operation is obtained. Preferably the control and power windings of the motor have a high ratio of inductive reactance to resistance, for example from 6 to 1 to 8 to 1, at the frequency of the alternating current supplied by the lines L' and L''. This provides for maximum power during running with the least amount of heating and also provides a low impedance path in the control winding 32 for anti-hunting control purposes. By so designing the motor, reduction in heating thereof during its stalled condition is also obtained.

As may be seen by reference to Fig. 3, energizing current is supplied to the power winding 31 from the alternating current supply lines L' and L'' through a circuit which may be traced from the alternating current supply line L' through the power winding 31 and a condenser 185 to the supply line L''. The condenser 185 is so chosen with respect to the inductance of the power winding 31 as to provide a substantially series resonant circuit when the rotor 30 is rotating at approximately full speed. Since the power winding circuit is resonant, its total impedance is substantially equal to the resistance of the power winding 31. This resistance is relatively low, and therefore, a large current flow through the power winding is made possible, resulting in the production of maximum power and torque by the motor. Due to the series resonant circuit also the current flow through the power winding 31 is substantially in phase with the supply line voltage. The voltage produced across the power winding 31, however, leads the current flow by substantially 90° because of the inductance of the power winding.

When the rotor 30 is operating at substantially maximum speed the apparent inductance of the power winding 31 is a maximum whereupon the series resonant circuit is resonant to the applied alternating current from the supply lines L' and L''. As the speed of rotation of the rotor 30 decreases the apparent inductance of the power winding 31 decreases, and therefore, disturbs to some degree the resonant condition. This causes a slight phase shift in the current through and the voltage produced across the power winding, the voltage shifting somewhat more than the current and consequently reducing the power loss in the power winding. In addition, the change from the resonant condition causes a reduction in the current flow through the power winding and because of the decrease in apparent inductance, the voltage across the power winding 31 also decreases. This produces a further reduction of power loss in the power windings. As a result, there is a substantial reduction of heating of the power winding when the rotor 30 is at rest.

As shown in Figs. 2 and 3, the undulating voltage produced between the output terminals 183 and 184 of the frequency discriminator 12 is amplified by means of the voltage amplifier 14. The voltage amplifier 14, as seen in Fig. 3, includes a tube 186 which is a triode and, for example, may comprise one triode section of a commercially available 7N7 tube or any other tube having similar characteristics. The tube 186 includes an anode 187, a control grid 188, a cathode 189 and a heater filament 190, to the latter of which energizing current is supplied from the transformer secondary winding 97.

The input circuit of the triode 186 is controlled in accordance with the undulating voltage drop produced between the discriminator output terminals 183 and 184 and to this end the control grid 188 is connected through a condenser 191 to the terminal 183 and the terminal 184 is connected directly to the cathode 189. A resistance 192 is also connected between the control grid 188 and the cathode 189. The cathode 189 is connected directly to ground G. It will be apparent that if desired the condenser 191 may be eliminated and direct coupling employed between the output terminals of the discriminator 12 and the input circuit of the tube 186. In some cases it is preferable to employ direct coupling for the purpose of minimizing distortion of the square wave character of the discriminator output voltage.

Anode voltage is supplied to the triode 186 from the voltage divider resistance 102 through a circuit which may be traced from the terminal b through a pair of series connected resistances 193 and 194 to the anode 187 and the cathode 189 to the grounded terminal d. A condenser 195 is also connected between the point of engagement of resistances 193 and 194 and the grounded terminal d for the purpose of providing additional filtering of the anode voltage.

The power amplifier 16 includes in addition to the transformer 179 a twin triode tube 196 which may be of the commercially available type 7N7, one triode including an anode 197, a control grid 198, a cathode 199 and a heater filament 200, while the other triode includes an anode 201, a control grid 202, a cathode 203 and a heater filament 204. Energizing current is supplied to each of the heater filaments 200 and 204 from the transformer secondary winding 97.

The control grids 198 and 202 are directly connected to each other and to a contact 205 which is in engagement with and is adjustable along the length of a resistance 206. The resistance 206 has one end terminal connected through a condenser 207 to the anode 187 of the voltage amplifier tube 186 and has its other end terminal connected to ground G. The resistance 206 and condenser 207 are provided for impressing the fluctuating or undulating component of voltage produced in the output circuit of the voltage amplifier 14 on the input circuit of the power amplifier 16 while preventing the direct current component of the current flowing through the anode circuit of the tube 186 from being impressed on the input circuit of the power amplifier 16. Since the power amplifier control grids 198 and 202 are connected together, the output voltage from the voltage amplifier 14 is impressed simultaneously and equally on both of the input circuits of the triodes contained in tube 196. The adjustable resistance 205 is provided to facilitate adjustment in the gain of the power amplifier 16.

Anode voltage is supplied to the triodes of the power amplifier 16 from the split secondary winding 181 on the transformer 179. To this end the anode 197 is connected to the left end terminal of the winding 181 while the anode 201 is connected to the right end terminal of that winding. The cathodes 199 and 203 are connected together and through a biasing resistance 208 to ground G. The center tap on the split secondary winding 181 is connected through the control winding 32 of the motor 15 to ground G to which the cathodes 199 and 203 are also connected by the biasing resistance 208.

Power is supplied to the motor control winding 32 from the split secondary winding 181 through the anode circuits just traced of the tube 196. A condenser 209 is connected in parallel with the control winding 32 and is so selected as to provide a parallel resonant circuit during both the stalled and running conditions of the motor. This parallel resonant circuit presents a relatively high external impedance and a relatively low internal impedance. The relatively high external impedance of the parallel resonant circuit matches the impedance of the anode circuits of the power amplifier triodes, and therefore, provides for optimum conditions of operation. The relatively low internal circuit impedance of the control winding 32 and the condenser 209 approximates the actual resistance of the control winding 32, and since this resistance is relatively low, the impedance of the internal circuit is also relatively low, making possible a large current flow through the control winding.

The sections of the split transformer secondary winding 181 are so wound on the transformer 179 that the anode 197 of the power amplifier tube 196 is driven positive during one half cycle of the alternating current supply voltage. For convenience of explanation, this half cycle is hereinafter referred to as the first half cycle. The anode 201 of the other triode is driven positive during the opposite or second half cycle. In the first half cycle the anode 201 is negative with respect to the potential of the center tap, but in the second half cycle the anode 201 becomes positive while the anode 197 becomes negative with respect to the potential of the center tap. The voltage on the anode 197 accordingly may be assumed to increase and decrease in phase with the supply line voltage while the voltage on the anode 201 increases and decreases 180° out of phase with the supply line voltage. This relationship always remains substantially the same.

While the foregoing description of the motor drive apparatus including the voltage amplifier 14 and the power amplifier 16 and its operation is believed sufficient for the present purposes, reference is made to the aforementioned Wills patent for a more detailed description thereof.

When the rate of fluid flow through the conduit 1 remains at the desired value, the frequency of oscillation of the high frequency current output from the frequency mixer 10 is the frequency value to which the discriminator 12 is balanced. Accordingly, the output terminals 183 and 184 of the frequency discriminator are maintained at the same potential during both half cycles of the voltage supplied by the supply lines L' and L", and the motor 15 is not energized for rotation in either direction and remains stationary.

Upon an increase in the rate of fluid flow through the conduit 1 the manometer 2 operates the detuning condenser 3 to make an adjustment of the condenser plate 27 in the clockwise direction to decrease the condenser capacity. This produces an increase in the frequency of oscillation of the oscillator 4 which is operative to cause an increase in the frequency of oscillation of the output current from the frequency mixer 10 which is applied to the input terminals of the frequency discriminator 12. As a result, an undulating voltage in phase with the voltage of the supply lines L' and L" appears between the discriminator output terminals 183 and 184. This undulating voltage is amplified by the voltage amplifier 14 and impressed on the input circuit of the power amplifier 16 for selectively energizing the motor 15 for rotation in one direction. The motor 15 then operates through the cable drive mechanism to adjust the movable condenser plates 46 of the retuning condenser 9 in the frequency determining circuit of the oscillator 8 in the proper direction to cause the difference in frequency of the high frequency oscillating currents from the oscillators 4 and 8 and flowing in the output circuit of the frequency mixer 10 to be restored to the frequency value to which the frequency discriminator 12 is tuned. When the condenser 9 has been so adjusted the motor 15 is deenergized for rotation and quickly comes to rest.

It is noted that when the discriminator 12 is tuned to the sum of the frequencies of the oscillators 4 and 8, the motor 15 operates the retuning condenser 9 in the proper direction as required to cause a decrease in frequency of oscillator 8 exactly corresponding to the increase in frequency of oscillator 4 caused by the adjustment of condenser 3.

Upon a decrease in the rate of fluid flow through the conduit 1 the manometer 2 operates the detuning condenser 3 in the opposite direction to increase its capacity. This produces a decrease in the frequency of oscillation of the transmitter oscillator 4 and consequently a decrease in the frequency of oscillation of the oscillating current in the output of the frequency mixer 10. As a result, an undulating voltage of opposite phase with respect to the voltage supplied by the supply lines L' and L" is produced between the discriminator output terminals 183 and 184. The motor 15 is then energized for rotation in the opposite direction to effect an adjustment of the retuning condenser 9 in the reverse direction to cause the frequency of oscillation of the oscillating current in the output circuit of the frequency mixer 10 to be restored to the value to which the frequency discriminator 12 is tuned. When such adjustment has been given the condenser 9, the energizing current urging the motor 15 to rotation is reduced to zero and the motor 15 quickly comes to rest.

Thus, the motor 15 operates in one direction or the other accordingly as the frequency of oscillation of the current flow in the output circuit of the frequency mixer 10 increases or decreases from the value to which the discriminator 12 is tuned. Moreover, the speed of the motor 15 in either direction is directly dependent, within a predetermined range, upon the magnitude of the change in the said frequency of oscillation.

As those skilled in the art will understand, my present invention in its practical application is not restricted to the use of a variable condenser 3 for detuning the transmitter oscillator 4 in response to a change in the rate of fluid flow through the conduit 1 or in the particular variable condition under measurement and also is not restricted to the use of a variable condenser 9 for retuning the receiver oscillator 8. For example, the said detuning and retuning adjustments of oscillators 4 and 8 may be effected solely by means of variable inductive reactance elements or by a combination of capacitive and inductive reactance elements. When inductive reactance elements are employed for accomplishing the detuning and retuning adjustments of the oscillators, it may be desirable in some cases to provide inductive reactance elements of the type having high frequency cores in order to produce a relatively large change in frequency of oscillation for a small movement of the actuating element.

Figure 10:
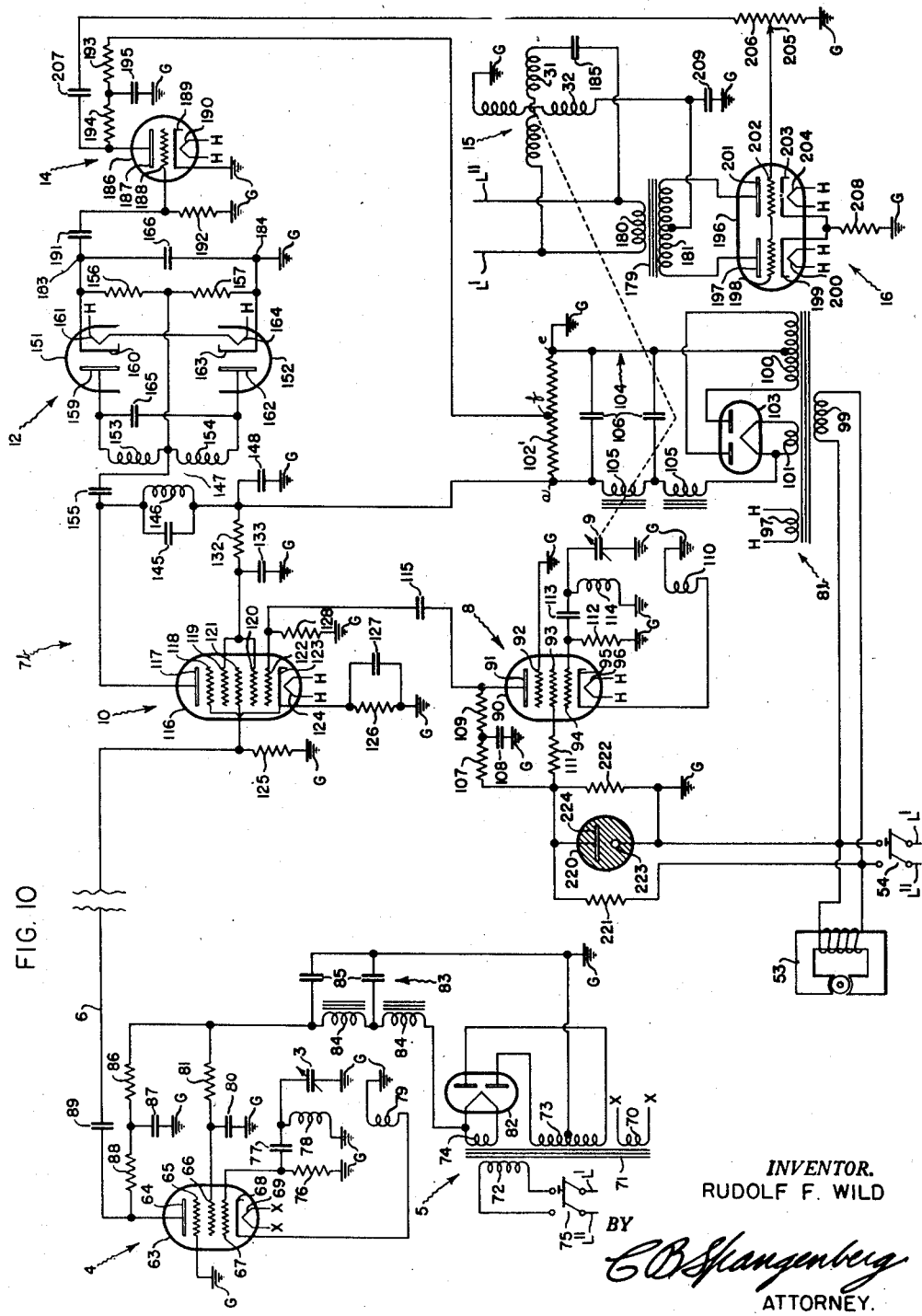
Fig. 10 is a wiring diagram illustrating in detail the electrical circuit components of the block diagram of Fig. 9.
Figure 11:
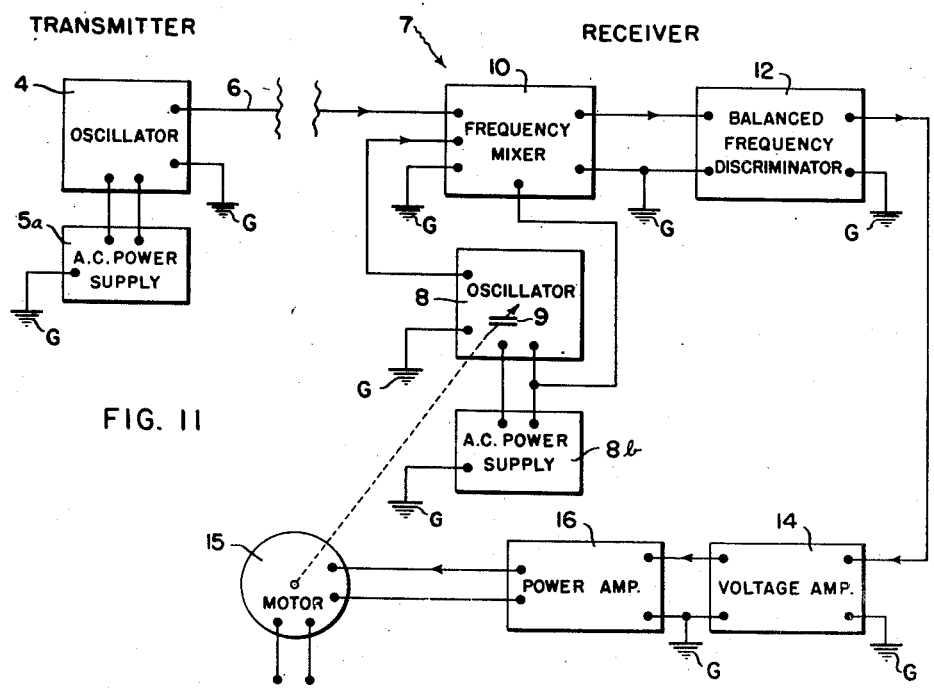
Fig. 11 is a block diagram illustrating a still further modification of the electrical circuit arrangement of the apparatus of Fig. 1.

In Figs. 7 through 11 I have illustrated more or less diagrammatically modifications of the arrangement shown in Figs. 2 and 3 which differ from the latter arrangement by the application of direct oscillator amplitude modulation or keying thus permitting the keyer 13 to be dispensed with, and therefore, permitting an appreciable reduction in the amount of equipment involved. Figs. 7 and 8 collectively illustrate one such modification, Figs. 9 and 10 collectively illustrate another modification, and Fig. 11 illustrates a third modification. Each of these modifications differs from the arrangement of Figs. 2 and 3 in that the frequency discriminator 12 is tuned to the sum of the frequencies of the oscillating currents generated by the oscillators 4 and 8 rather than to the difference in those frequencies. It is noted, however, that if desired, the frequency discriminator of the arrangement of Fig. 11 may also be tuned to the difference between the frequencies of the transmitter and receiver oscillators. It is noted further that the frequency discriminator in the modifications of Figs. 7 through 10 may be tuned to the difference between the frequencies of the transmitter and receiver oscillators provided that a suitable filter is interposed between the frequency mixer 10 and the frequency discriminator 12 to prevent oscillating currents of the relatively high frequency produced by oscillators 4 and 8 from being impressed on the discriminator 12. For convenience of illustration, parts in Figs. 7 through 11 corresponding to parts in Figs. 2 and 3 have been identified by the same reference numerals.

The modification of Figs. 7 and 8, as may readily be seen by reference to the block diagram of Fig. 7, differs in construction from the arrangement described in Figs. 2 and 3 by the provision of alternating current power supply means indicated by the reference numeral 5a in lieu of the direct current power supply means 5 shown in Figs. 2 and 3. The alternating current power supply means 5a provides alternating current anode voltage for the oscillator 4, and consequently, high frequency oscillating currents flow in the output circuit of the oscillator 4 only during the alternate half cycles of the alternating voltage provided by the alternating current power supply means when the anode 64 of the oscillator tube 63 is positive with respect to the potential of the cathode 68. During the other half cycle when the anode 64 is negative with respect to the cathode potential, no currents flow in the output circuit of the oscillator.

According to this modification of my invention, the alternating current supplied by the alternating current power supply means 5a is preferably of the same frequency as that of the alternating current supplied to the receiver 7 by the supply lines L' and L". To this end the alternating current power supply means 5a at the transmitter may desirably be also supplied by the supply lines L' and L". It is not essential, however, that the transmitter and the receiver be both energized from the same alternating current supply lines and it is sufficient if this transmitter and receiver are both energized with alternating current of the same frequency. This feature is of importance when the modification of Figs. 7 and 8 is employed in telemetering or remote control applications. In such applications the transmitter and receiver may be so remotely located with respect to each other that it is not practically feasible to supply alternating current to both units from the same power supply lines. For convenience of illustration, however, in Figs. 7 and 8 the transmitter and receiver have been shown as being supplied with alternating current from the same supply lines.

Referring to Fig. 8 it will be noted that the alternating current power supply means 5a for supplying alternating anode voltage to the oscillator tube 63 includes a gaseous discharge tube designated by the reference numeral 210 and a pair of resistances 211 and 212. The resistance 212 is connected in parallel with the tube 210 and the resistance 211 connects the parallel network to the supply lines L' and L". Tube 210 is provided with an anode 213 and a cathode 214, the anode 213 being connected to ground G and also to the supply line L' while the cathode 214 is connected through the resistance 211 to the supply line L". The gaseous discharge tube 210 operates conjointly with the resistance 212 to produce a pulsating potential of substantially square wave form and of the same frequency as the voltage of the supply lines L' and L" across the resistance 212. That pulsating voltage across the resistance 212 is impressed on the anode and screen circuits of the oscillator tube 63, which circuits are identical to the corresponding anode and screen circuits of the oscillator 4 shown in detail in Fig. 3. When the anode and screen circuits of the oscillator 4 are so energized, high frequency oscillating currents flow in the anode circuit during the intervals when the anode 64 and the screen 66 are positive in potential with respect to the cathode 68 and during the alternate intervals no high frequency currents flow through the anode circuit of the oscillator 4. Accordingly, high frequency oscillating currents are impressed on the transmission line 6 during only the regularly recurring intervals when the anode 64 and the screen 66 are positive, those intervals corresponding to one half cycle of the alternating current supply lines L' and L".

As shown, the alternating current supply means 5a also includes a transformer 71a for supplying energizing current to the heater filament 69 of the oscillator tube 63. Transformer 71a includes a line voltage primary winding 71b having its terminals connected to the supply lines L' and L" and is provided with a secondary winding 71c having its terminals connected to the heater filament 69 through conductors not shown.

The receiver 7 shown in Fig. 8 for detecting and responding to the high frequency oscillating currents regularly interrupted at the frequency of the voltage of the supply lines L' and L" and transmitted to it over the transmission line 6 is identical to the receiver 7 of Fig. 3 except that the buffer 11 and the keyer 13 have been eliminated and that an additional stage of amplification has been provided in the voltage amplifier 14.

As shown, anode and screen voltages are supplied to the receiver oscillator 8, the frequency mixer 10, and the voltage amplifier 14 from D. C. power supply means 8a which may be identical to the D. C. power supply means 8a of Fig. 3 except that a voltage divider resistance 102' having only terminals a, f and e is employed in lieu of the voltage divider resistance 102. The negative terminal e on the divider resistance 102' is directly connected to ground G. Anode and screen voltages are supplied to the receiver oscillator 8 and the frequency mixer 10 from the positive terminal a.

Anode voltage is supplied to the voltage amplifier tube 186 from the terminal f on the voltage divider resistance 102' through a resistance 215 and through the resistances 193 and 194 to the anode 187. As shown, the output circuit of the voltage amplifier tube 186 is coupled to the input circuit of a voltage amplifier tube 186', the latter of which may be a triode of the same type as the triode 186. For example, the triodes 186 and 186' may each comprise a section of the commercially available type 7N7 tube. The triode 186' includes an anode 187', a control grid 188', a cathode 189' and a heater filament 190'. Energizing current is supplied to the filament 190' from the transformer secondary winding 97.

Anode voltage is supplied the triode 186' through a circuit which may be traced from the terminal f on the voltage divider resistance through resistance 215 and a resistance 216 to the anode 187' and the cathode 189' to ground G and thereby to the negative terminal e of the voltage divider resistance 102'. A condenser 217 is connected between ground G and the point of engagement of resistances 215 and 216 for providing additional filtering of the voltage impressed on the anode 187'.

The output circuit of the triode 186 is coupled to the input circuit of the triode 186' by means of the condenser 207 and a resistance 218. Specifically, the anode 187 is connected by the condenser 207 to the control grid 188' of the triode 186' and the control grid 188' is connected by means of the resistance 218 to its associated cathode 189'. In this manner the alternating component of current flowing in the anode circuit of the triode 186 is impressed on the input circuit of the triode 186'. The amplified quantity of the alternating component which flows in the anode circuit of the triode 186' is impressed by means of a condenser 219 and the potentiometer resistance 206 and associated contact 205 on the input circuits of the triodes included in the tube 196 of the power amplifier 16.

The operation of this modification of my invention will now be described. As has been noted hereinbefore in connection with the description of the arrangement of Fig. 3, there are two conditions of operation of the frequency discriminator 12 in which the voltage output from the discriminator is substantially zero. The first of these conditions is that in which no high frequency currents are impressed on the input circuit of the frequency discriminator and the second condition is that in which the high frequency currents impressed on the input circuit of the discriminator are of the frequency value to which the discriminator is tuned. As those skilled in the art will understand, there also is a third condition of operation in which the output voltage from the discriminator is zero, namely that which exists when the high frequency currents impressed on the input circuit of the frequency discriminator have a frequency value which is widely displaced from the frequency value to which the discriminator is tuned. This characteristic of the operation of the frequency discriminator 12 is taken advantage of in the modification of my invention shown in Fig. 8 in order to derive an undulating voltage between the discriminator output terminals 183 and 184 of the same frequency as the voltage of the supply lines L' and L'' and in phase or 180° out of phase therewith.

During the first half cycles when positive anode and screen voltages are supplied to the oscillator tube 63, hereinafter termed the operative half cycles, high frequency oscillating currents are impressed over the transmission line 6 on the frequency mixer 10 and during those same intervals high frequency oscillating currents are impressed on the frequency mixer 10 by the receiver oscillator 8. When the system is balanced the sum of the two high frequency oscillating currents is equal to the frequency value to which the frequency discriminator 12 is tuned, and consequently, substantially zero output voltage is produced between the output terminals 183 and 184 of the discriminator. During the alternate half cycles no high frequency oscillating currents are impressed on the frequency mixer 10 from the transmitter oscillator 4, and therefore, the high frequency currents flowing in the output circuit of the frequency mixer 10 and impressed on the input circuit of the frequency discriminator 12 are of the same frequency as the high frequency oscillating currents impressed on the input circuit of the frequency mixer 10 by the receiver oscillator 8. This high frequency oscillating current then impressed on the input circuit of the frequency discriminator 12 is of a value which is widely different from the value to which the frequency discriminator is tuned, namely the sum of the receiver and transmitter oscillator frequencies, and accordingly, the voltage produced between the output terminals 183 and 184 of the discriminator will be substantially zero. This zero output voltage condition is always the same during the regularly recurring intervals when no high frequency oscillating currents are impressed on the frequency mixer 10 from the transmitter oscillator 4.

Consequently, when the sum of the high frequency oscillating currents produced by the transmitter oscillator 4 and the receiver oscillator 8 deviates from the value to which the frequency discriminator 12 is tuned, as upon variation in the adjustment of condenser 3, a unidirectional voltage of one polarity or the other depending on the direction of deviation is produced between the output terminals 183 and 184 of the discriminator 12 during the operative half cycles. During the other half cycles when high frequency oscillating currents from the oscillator 8 are alone impressed on the frequency mixer 10 by the receiver oscillator 8, substantially zero output voltage is obtained between the discriminator output terminals 183 and 184. Thus, upon unbalance of the system a pulsating unidirectional voltage of one polarity or the other is produced between the discriminator output terminals 183 and 184. The pulsations in the unidirectional voltage produced between said output terminals are of the same frequency as the alternating voltage supplied by the supply lines L' and L'' and are of one phase or of opposite phase relatively thereto depending upon the direction of adjustment of the condenser 3 from the position in which zero output voltage is obtained between the discriminator output terminals 183 and 184 during the operative half cycles.

This pulsating or undulating voltage of one phase or of opposite phase is amplified by the voltage amplifier 14 and the amplified quantity is impressed on the power amplifier 16 for selectively controlling the rotation and the direction of rotation of the reversible motor 15. The operation of the motor 15 is utilized to effect the required adjustment of the retuning condenser 9 in the frequency determining circuit of the oscillator 8 needed to reduce the undulating voltage between the discriminator output terminals 183 and 184 to zero, and hence to rebalance the apparatus.

The modification of my invention shown in Figs. 9 and 10 differs from that shown in Figs. 7 and 8 only in that direct current voltage supply means 5 are provided at the transmitter and alternating current power supply means 8b are provided at the receiver and in that only one stage of amplification is provided in the voltage amplifier 14. I now prefer the modification of Figs. 9 and 10 over that shown in Figs. 7 and 8 in that the arrangement of Figs. 9 and 10 is entirely independent of frequency and phase shifts which may occur between the sources of alternating voltage provided at the transmitter and receiver.

As may be seen by reference to Figs. 9 and 10, the transmitter 4 and the D. C. power supply means 5 are identical to the correspondingly identified parts of Figs. 2 and 3. The receiver 7b is identical to the receiver 7 of Figs. 2 and 3 with the exception that the keyer 13 is omitted and a gaseous discharge tube 220 and associated resistances 221 and 222 have been provided for supplying alternating anode voltage to the receiver oscillator 8. The gaseous discharge tube 220 is provided with an anode 223 and a cathode 224, which elements are shunted by the resistance 222. The anode 223 is connected through the switch 54 to the supply line L' and the cathode 224 is connected through the resistance 221 and switch 54 to the supply line L''. The gaseous discharge tube 220 together with the resistances 221 and 222 operate to provide pulsating unidirectional voltage of substantially square wave form pulsating at the frequency of the supply lines L' and L'' to the anode and screen circuits of the oscillator 8. Unidirectional voltage is supplied to the frequency mixer 10 and to the voltage amplifier 14 from the D. C. supply means included in the supply means 8b.

It is noted that the anode and screen grid circuits of the frequency mixer 10 may be supplied with alternating or fluctuating energizing voltage of the same frequency as the voltage of the supply lines L' and L'', and for example, may be supplied with such energizing voltages from the tube 220 and resistance 222. When so energized current flows in the output circuit of the frequency mixer 10 only during the half cycle that the oscillator 8 produces high frequency currents, and as a consequence, with such an arrangement no high frequency currents are impressed on the input circuit of the discriminator 12 during the half cycles when the oscillator 8 is not operative and no discriminator output voltage is produced during those half cycles.

It will be apparent that alternating or fluctuating anode and screen grid voltages may also be supplied to the frequency mixer 10 in the arrangement shown in Figs. 7 and 8 and so arranged that the frequency mixer tube 116 is conductive only during the half cycles when the oscillator 4 is operative and transmits high frequency oscillations to the receiver 7.

The operation of the modification of my invention shown in Figs. 9 and 10 is substantially identical to that of Figs. 7 and 8, and therefore, it is believed that a detailed explanation thereof is not necessary. Suffice it to say that high frequency oscillating currents are continuously supplied to the frequency mixer 10 from the transmitter oscillator 4 and high frequency oscillating currents are supplied to the frequency mixer 10 from the receiver oscillator 8 only during regularly recurring intervals, which intervals correspond to the half cycles of the voltage of the supply lines L' and L" when positive voltage is impressed on the anode and screen circuits of the oscillator 8. When the sum of these two high frequency oscillating currents is equal to the frequency value to which the frequency discriminator 12 is tuned, substantially zero voltage is produced between the output terminals 183 and 184. During the alternate half cycles of the voltage of the supply lines L' and L", high frequency oscillating currents are impressed on the input circuit of the frequency mixer 10 only from the transmitter oscillator 4, and therefore, the high frequency oscillating currents impressed on the input circuit of the frequency discriminator 12 are of this same high frequency. This frequency is widely displaced from the value to which the frequency discriminator 12 is tuned, and consequently, substantially zero output voltage is obtained between the output terminals 183 and 184.

Upon adjustment in the position of the detuning condenser 3 in the frequency determining circuit of the transmitter oscillator 4 and consequent departure in the sum of the frequencies of the transmitter and receiver oscillations from the value to which the frequency discriminator 12 is tuned, a unidirectional voltage will be produced between the discriminator output terminals 183 and 184 during the half cycles when both oscillators 4 and 8 impress high frequency oscillating currents on the input circuit of the frequency discriminator 12. This unidirectional voltage will be of one polarity or the other depending upon the direction of deviation. During the other half cycles when the oscillator 8 is inoperative to generate a high frequency oscillating current, the terminals 183 and 184 will be at the same potential. Thus, the voltage produced between the terminals 183 and 184 will pulsate at the frequency of the voltage of the supply lines L' and L". Moreover, the pulsating or undulating voltage so produced between the discriminator output terminals will be of one phase or of opposite phase with respect to the alternating voltage of the supply lines L' and L". This pulsating voltage is employed by means of the voltage amplifier 14 and the power amplifier 16 to selectively control the rotation and direction of rotation of the reversible motor 15 as required to effect the necessary adjustment in the retuning condenser 9 required to reduce to zero the said pulsating voltage.

The modification of my invention shown in the block diagram of Fig. 11 differs from the modifications shown in Figs. 7 through 10 in that alternating current power supply means 5a are provided at the transmitter and alternating current power supply means 8b are also provided at the receiver. The alternating current power supply means 5a may be identical to the correspondingly identical part of Figs. 7 and 8 and the alternating current power supply means 8b may be identical to the correspondingly identified part of Figs. 9 and 10. Thus, the transmitter and the receiver oscillators are both supplied with alternating current anode and screen voltages. With this modification of my invention, it is desirable that the alternating current power supply means 5a at the transmitter and the alternating current power supply means 8b at the receiver should be supplied by common alternating current supply lines or that the voltage of the alternating current power supply lines should be approximately in phase.

While it is believed that the operation of the arrangement of Fig. 11 will be apparent from the descriptions of the previous modifications given hereinbefore, it is noted that positive anode and screen voltages should be supplied to the transmitter oscillator 4 and to the receiver oscillator 8 during the same half cycles of the alternating current power supply means. That is to say, the anode and screen elements of the transmitter and receiver oscillators are both driven positive during the same intervals. The alternating current supply means 8b in the modification of Fig. 11 may also be employed to supply anode voltage to the anode and screen circuits of the frequency mixer 10. As those skilled in the art will recognize, it is not necessary with this modification to supply unidirectional anode and screen voltages to the frequency mixer 10 inasmuch as the transmitter and receiver oscillators both impress high frequency currents on the input circuits of the frequency mixer 10 only during one half cycle of the voltage of the alternating current supply means. It is during this half cycle that positive anode and screen grid voltages are supplied to the frequency mixer 10 from the alternating current power supply means 8b.

As previously noted, the frequency discriminator of this modification may be tuned either to the sum or the difference of the frequencies of the high frequency oscillating currents generated by the oscillators 4 and 8. The operation of this modification is substantially the same as that of the arrangement of Figs. 2 and 3 in that zero output voltage is created between the discriminator output terminals 183 and 184 when no high frequency currents are applied to the discriminator and also when the frequency of the high frequency oscillating currents applied thereto is equal to the frequency to which the discriminator is tuned. Upon deviation in the frequency of the high frequency oscillating currents applied to the discriminator from this value, an undulating voltage of the same frequency as the voltage of the supply lines L' and L" and in phase or 180° out of phase therewith, depending upon the direction of the deviation, is produced between the discriminator output terminals 183 and 184.

While, in accordance with the provisions of the statutes, I have illustrated and described the best forms of my invention now known to me, it will be apparent to those skilled in the art that changes may be made in the forms of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. In combination, first and second means to generate separate oscillations of relatively high frequency, frequency mixing means to heterodyne said oscillations, voltage producing frequency discriminating means responsive to the frequency of an oscillating component of the resulting oscillations produced by said frequency mixing means to produce a voltage of one polarity or the other depending upon the direction of departure of the frequency of said oscillating component from a predetermined value, and means to effect modification of the amplitude of said oscillating component before application thereof to said frequency discriminating means during predetermined time intervals of a relatively low frequency to cause said frequency discriminating means to produce a voltage undulating at said low frequency.

2. In combination, first and second means to generate separate oscillations of relatively high frequency, frequency mixing means to heterodyne said oscillations to derive a resultant oscillation of a frequency equal to the difference of the frequencies of said separate oscillations, voltage producing frequency discriminating means responsive to the frequency of said resultant oscillation to produce a voltage of one polarity or the other depending upon the direction of departure of the frequency of said resultant oscillation from a predetermined value, and means to effect modification of the amplitude of said resultant oscillation before application thereof to said frequency discriminating means during predetermined time intervals of a relatively low frequency to cause said frequency discriminating means to produce a voltage undulating at said low frequency.

3. In combination, first and second means to generate separate oscillations of relatively high frequency, frequency mixing means to heterodyne said oscillations to derive a resultant oscillation of a frequency equal to the sum of the frequencies of said separate oscillations, voltage producing frequency discriminating means responsive to the frequency of said resultant oscillation to produce a voltage of one polarity or the other depending upon the direction of departure of the frequency of said resultant oscillation from a predetermined value, and means to effect modification of the amplitude of said resultant oscillation before application thereof to said frequency discriminating means during predetermined time intervals of a relatively low frequency to cause said frequency discriminating means to produce a voltage undulating at said low frequency.

4. In combination, first and second means to generate separate oscillations of relatively high frequency, frequency mixing means to heterodyne said oscillations, voltage producing frequency discriminating means responsive to the frequency of an oscillating component of the resulting oscillations produced by said frequency mixing means to produce a voltage of one polarity or the other depending upon the direction of departure of the frequency of said oscillating component from a predetermined value, means to effect modification of the amplitude of said oscillating component before application thereof to said frequency discriminating means during predetermined time intervals of a relatively low frequency to cause said frequency discriminating means to produce a voltage undulating at said low frequency, and means controlled by said undulating voltage to vary the frequency of oscillation of one of said relatively high frequency oscillations to restore the frequency of said oscillating component to said predetermined value.

5. In combination, first and second means to generate separate oscillations of relatively high frequency, frequency mixing means to heterodyne said oscillations to derive a resultant oscillation having a frequency determined jointly by both of said separate oscillations, tuned frequency discriminating means responsive to the frequency of said resultant oscillation to produce a voltage of one polarity or the other accordingly as the frequency of said resultant oscillation is greater or less than the frequency to which the discriminating means is tuned, means to effect modification of the amplitude of said resultant oscillation before application thereof to said frequency discriminating means during predetermined time intervals of a relatively low frequency to cause the voltage produced by said frequency discriminating means to undulate at said low frequency, the undulations being of one phase or of opposite phase according to the polarity of the voltage, reversible motor means to restore the frequency of said resultant oscillation to the value to which the frequency discriminating means is tuned, said reversible motor means having a pair of windings on one of which an undulating voltage of said relatively low frequency is adapted to be impressed, and means responsive to the undulating voltage produced by said frequency discriminating means to impress on the other of said windings an undulating voltage of said low frequency and of one phase or of opposite phase relatively to the undulating voltage impressed on said one winding accordingly as said first mentioned undulating voltage is of one phase or of opposite phase.

6. In combination, means to generate an oscillation of relatively high frequency, frequency mixing means to heterodyne said oscillation with another oscillation of relatively high frequency applied thereto to derive a resultant oscillation of a frequency determined jointly by the frequencies of both of said oscillations of relatively high frequency, means to effect modification of the amplitude of said resultant oscillation before application thereof to said frequency discriminating means during predetermined time intervals of a relatively low frequency, and voltage producing discriminating means responsive to the frequency of said resultant oscillation to produce a voltage undulating at said low frequency.

7. In combination, adjustable means to generate an oscillation of relatively high frequency, frequency mixing means to heterodyne said oscillation with another oscillation of varable and relatively high frequency applied thereto to derive a resultant oscillation of a frequency determined jointly by the frequencies of both of said oscillations of relatively high frequency, means to effect modification of the amplitude of said resultant oscillation during predetermined time intervals of a relatively low frequency, tuned frequency discriminating means to which said resultant oscillation is applied after modification of the amplitude thereof and responsive to the frequency of said resultant oscillation to produce an undulating voltage of one phase or of opposite phase accordingly as the frequency of said resultant oscillation is greater or less than the frequency to which the discriminating means is tuned, and phase responsive means controlled by said undulating voltage to adjust said first mentioned means to vary the frequency of the oscillation generated thereby as required to maintain the frequency of said resultant oscillation at the value to which said frequency discriminating means is tuned.

8. In combination, adjustable means to generate an oscillation of relatively high frequency, frequency mixing means to heterodyne said oscillation with another oscillation of variable and relatively high frequency applied thereto to derive a resultant oscillation of a frequency determined jointly by the frequencies of both of said oscillations of relatively high frequency, means to effect modification of the amplitude of said resultant oscillation during predetermined time intervals of a relatively low frequency, tuned frequency discriminating means to which said resultant oscillation is applied after modification of the amplitude thereof and responsive to the frequency of said resultant oscillation to produce an undulating voltage of one phase or of opposite phase accordingly as the frequency of said resultant oscillation is greater or less than the frequency to which the discriminating means is tuned, reversible motor means to adjust said first mentioned means to vary the frequency of the oscillations generated thereby as required to maintain the frequency of said resultant oscillation at the value to which said frequency discriminating means is tuned, said reversible motor means having a pair of windings on one of which an undulating voltage of said low frequency is adapted to be impressed, and means responsive to the undulating voltage produced by said frequency discriminating means to impress on the other of said windings an undulating voltage of said low frequency and of one phase or of opposite phase relatively to the undulating voltage impressed on said one winding accordingly as the undulating voltage produced by the frequency discriminating means is of one phase or of opposite phase.

9. In combination, adjustable means to generate an oscillation of relatively high frequency, frequency mixing means to heterodyne said oscillation with another oscillation of variable and relatively high frequency applied thereto to derive a resultant oscillation of a frequency deter mined jointly by the frequencies of both of said oscillations of relatively high frequency, means to effect modification of the amplitude of said resultant oscillation during predetermined time intervals of a relatively low frequency comprising means to amplitude modulate at said low frequency one of said oscillations of relatively high frequency, tuned frequency discriminating means responsive to said resultant oscillation to produce an undulating voltage of one phase or of opposite phase accordingly as the frequency of said resultant oscillation is greater or less than the frequency to which the discriminating means is tuned, and phase responsive means controlled by said undulating voltage to adjust said first mentioned means to vary the frequency of the oscillation generated thereby as required to maintain the frequency of said resultant oscillation at the value to which said frequency discriminating means is tuned.

10. In combination, adjustable means to generate an oscillation of relatively high frequency, frequency mixing means to heterodyne said oscillation with another oscillation of variable and relatively high frequency applied thereto to derive a resultant oscillation of a frequency determined jointly by the frequencies of both of said oscillations of relatively high frequency, means to effect modification of the amplitude of said resultant oscillation during predetermined time intervals of a relatively low frequency comprising means to amplitude modulate at said low frequency the oscillation generated by said first mentioned means, tuned frequency discriminating means responsive to said resultant oscillation to produce a voltage of one phase or of opposite phase accordingly as the frequency of said resultant oscillation is greater or less than the frequency to which the discriminating means is tuned, and phase responsive means controlled by said undulating voltage to adjust said first mentioned means to vary the frequency of the oscillation generated thereby as required to maintain the frequency of said resultant oscillation at the value to which said frequency discriminating means is tuned.

11. Means to create an undulating voltage of predetermined frequency and of one phase or of opposite phase accordingly as one of the beat frequencies of two oscillations of relatively high frequency is greater or less than a predetermined value including frequency mixing means to heterodyne said oscillations to derive a resultant oscillation having a frequency equal to the frequency of said one beat frequency, tuned frequency discriminating means responsive to the frequency of said resultant oscillation to produce a voltage of one polarity or the other accordingly as the frequency of said resultant oscillation is greater or less than the frequency to which the frequency discriminating means is tuned, and means to effect modification of the amplitude of said resultant oscillation before application thereof to said frequency discriminating means at said predetermined frequency to cause the voltage produced by said frequency discriminating means to undulate at said predetermined frequency and to be of one phase or of opposite phase according to the polarity thereof.

12. Means to create an undulating voltage of predetermined frequency and of one phase or of opposite phase accordingly as one of the beat frequencies of two oscillations of relatively high frequency is greater or less than a predetermined value including frequency mixing means to heterodyne said oscillations to derive a resultant oscillation having a frequency equal to the frequency of said one beat frequency, tuned frequency discriminating means responsive to the frequency of said resultant oscillation to produce a voltage of one polarity or the other accordingly as the frequency of said resultant oscillation is greater or less than the frequency to which said frequency discriminating means is tuned, and keying means interposed between said frequency mixing means and said frequency discriminating means to amplitude modulate said resultant oscillation at said predetermined frequency to cause the voltage produced by said frequency discriminating means to undulate at said predetermined frequency and to be of one phase or of opposite phase according to the polarity thereof.

13. Means to create an undulating voltage of predetermined frequency and of one phase or of opposite phase accordingly as one of the beat frequencies of two oscillations of relatively high frequency is greater or less than a predetermined value including frequency mixing means to heterodyne said oscillations to derive a resultant oscillation having a frequency equal to the frequency of said one beat frequency, tuned frequency discriminating means unresponsive to said oscillations of relatively high frequency but responsive to said resultant oscillation to produce a voltage of one polarity or the other accordingly as the frequency of said resultant oscillation is greater or less than the frequency to which said frequency discriminating means is tuned, and means to effect modification of the amplitude of said resultant oscillation at said predetermined frequency to cause the voltage produced by said frequency discriminating means to undulate at said predetermined frequency and to be of one phase or of opposite phase according to the polarity thereof comprising means to amplitude modulate one of said oscillations of relatively high frequency at said predetermined frequency.

14. Means to create an undulating voltage of predetermined frequency and of one phase or of opposite phase accordingly as one of the beat frequencies of two oscillations of relatively high frequency is greater or less than a predetermined value including frequency mixing means to heterodyne said oscillations to derive a resultant oscillation having a frequency equal to the frequency of said beat frequency, tuned frequency discriminating means unresponsive to said oscillations of relatively high frequency but responsive to said resultant oscillation to produce a voltage of one polarity or the other accordingly as the frequency of said resultant oscillation is greater or less than the frequency to which said frequency discriminating means is tuned, and means to effect modification of the amplitude of said resultant oscillation at said predetermined frequency to cause the voltage produced by said frequency discriminating means to undulate at said predetermined frequency and to be of one phase or of opposite phase according to the polarity thereof comprising means to amplitude modulate substantially in phase both of said oscillations of relatively high frequency at said predetermined frequency.

RUDOLF F. WILD.

REFERENCES CITED

The following references are of record in the file of this patent:

UNITED STATES PATENTS

| Number | Name | Date |
|---|---|---|
| 2,041,855 | Ohl | May 26, 1936 |
| 2,260,122 | Moore, Jr. | Oct. 21, 1941 |
| 2,280,019 | Alexandersson et al. | Apr. 14, 1942 |
| 2,361,437 | Trevor | Oct. 31, 1944 |
| 2,379,689 | Crosby | July 3, 1945 |